United States Patent
Fujii et al.

[11] Patent Number: 5,630,560
[45] Date of Patent: May 20, 1997

[54] TAPE CASSETTE

[75] Inventors: Hiroshi Fujii; Nobuyuki Kodama, both of Tokyo; Eiji Ohshima, Kanagawa, all of Japan

[73] Assignee: Sony Corporation, Tokyo, Japan

[21] Appl. No.: 382,161

[22] Filed: Feb. 1, 1995

[30] Foreign Application Priority Data

Feb. 3, 1994 [JP] Japan .................................. 6-030821
Feb. 10, 1994 [JP] Japan .................................. 6-036392

[51] Int. Cl.$^6$ ............................................. G11B 23/087
[52] U.S. Cl. .................................... 242/338; 242/347.1
[58] Field of Search .............................. 242/338, 338.2, 242/341, 347, 347.1; 360/132

[56] References Cited

U.S. PATENT DOCUMENTS

| | | |
|---|---|---|
| 4,626,948 | 12/1986 | Tanaka et al. . |
| 5,279,476 | 1/1994 | Fujii et al. ............................. 360/132 |
| 5,322,237 | 6/1994 | Ota et al. ............................ 242/347.1 |
| 5,331,498 | 7/1994 | Utsumi et al. ......................... 360/132 |
| 5,412,525 | 5/1995 | Ota et al. ............................ 242/338.3 |
| 5,438,471 | 8/1995 | Sawada et al. ........................ 360/132 |
| 5,453,896 | 9/1995 | Ohira ................................ 242/347.1 |

FOREIGN PATENT DOCUMENTS 0125688  11/1984  European Pat. Off. .

OTHER PUBLICATIONS

Patent Abstracts of Japan vol. 7, No. 150 (P-207), 30 Jun. 1983, JP-A-58 060475 (Sony KK) 9 Apr. 1983 *abstract*.

Primary Examiner—John P. Darling
Attorney, Agent, or Firm—William S. Frommer; Alvin Sinderbrand

[57] ABSTRACT

A tape cassette comprising a flat, box-like cassette case, a recording medium tape accommodated in the cassette case, and a lid for covering and protecting, when the tape cassette is not in use, the recording medium tape at a portion exposed out of the cassette case, wherein a fulcrum of the lid is composed of a fulcrum pin and a receiving portion for receiving and holding the fulcrum pin, the receiving portion being made of an elastic synthetic resin and having a circular inner peripheral face for receiving the fulcrum pin, the inner peripheral face being partially notched for providing an introducing portion, and a frontage of the introducing portion being slightly smaller than an outer diameter of the fulcrum pin. This setup makes extremely easy the work for having the fulcrum pin be supported in the receiving portion.

15 Claims, 31 Drawing Sheets

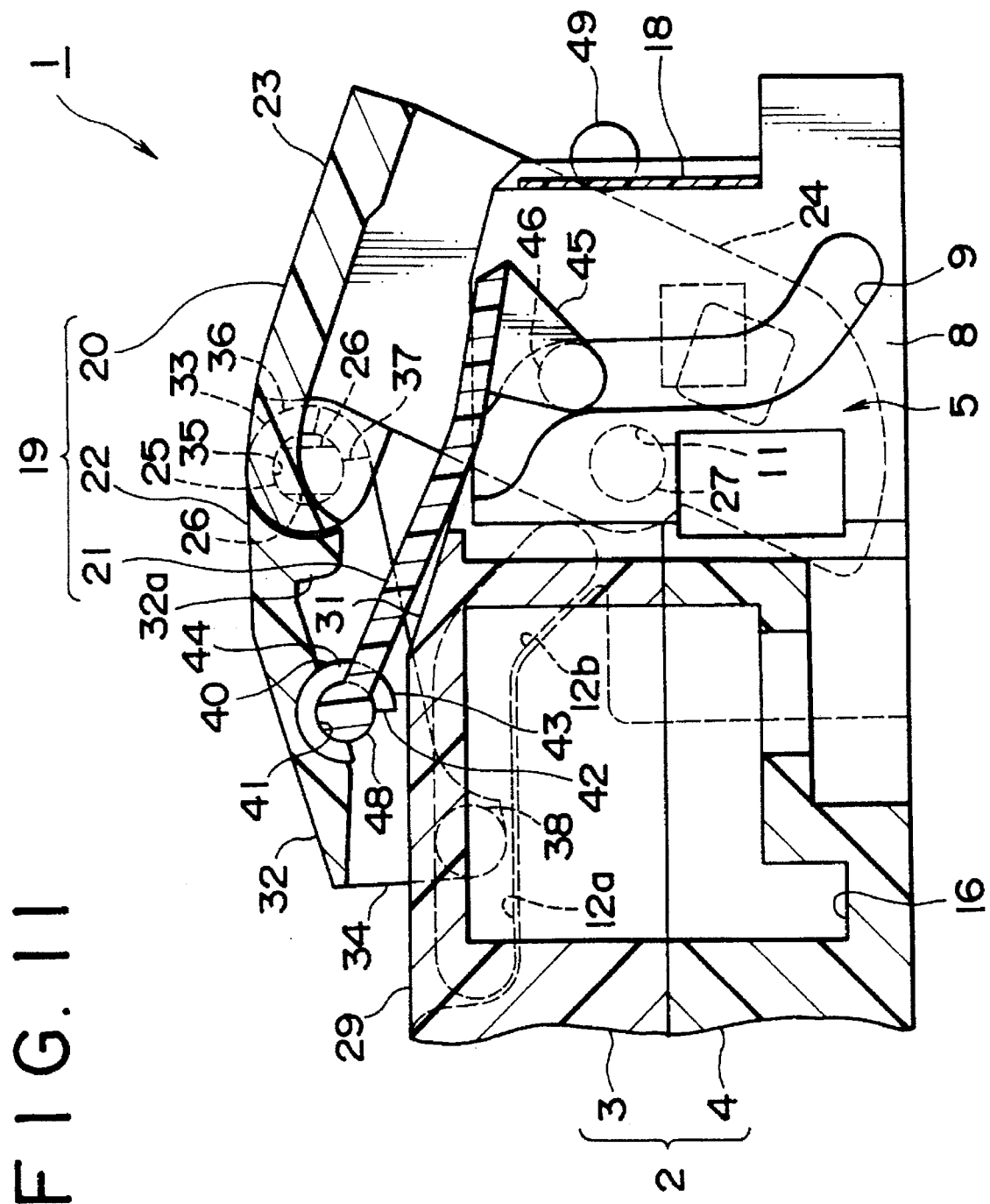
FIG. II

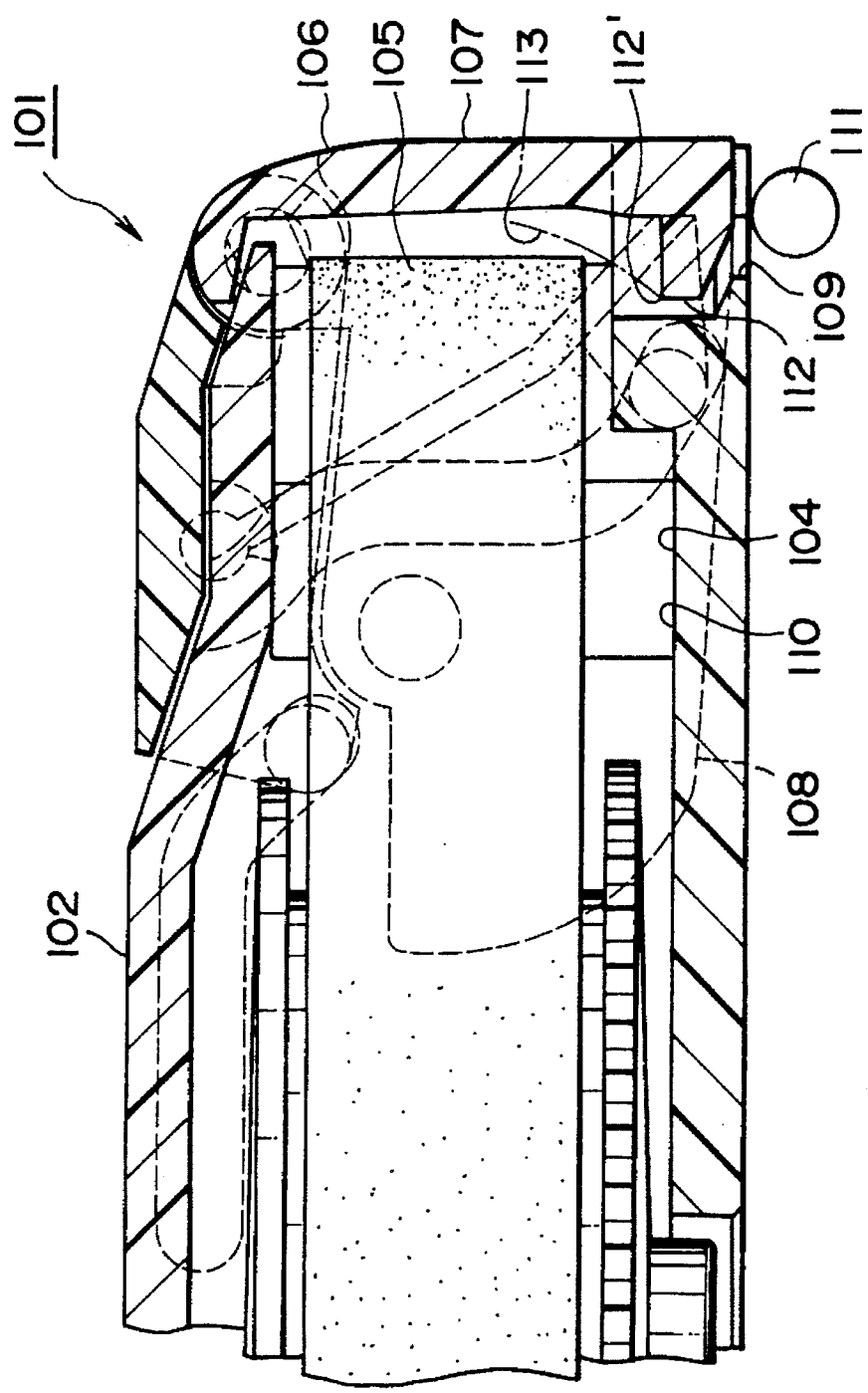

TAPE CASSETTE

BACKGROUND OF THE INVENTION

1. Field of the Invention

The present invention relates to a new tape cassette and, more particularly, to a tape cassette provided with a lid for protecting, when the tape cassette is not in use, a recording medium tape at a portion that is outside a cassette case accommodating the tape, wherein the lid is assembled on the tape cassette easily.

The present invention relates to a new tape cassette and, more particularly, to a tape cassette provided with a lid for covering and protecting, when the cassette tape is not in use, a recording medium tape accommodated in a cassette case of the tape cassette at a portion exposed outside the cassette case. An attitude of the lid when the lid is moving between a lid closed position in which the lid covers the recording medium tape when the tape cassette is not in use and a lid open position in which the lid exposes the cassette tape when the tape cassette is in use is controlled by slidably engaging a guided pin formed on a face opposite to the lid along a guide groove formed on an external face of the cassette case. This setup facilitates the engagement of the guided pin of the lid with the guide groove of the cassette case.

The present invention relates to a new tape cassette and, more particularly, to a tape cassette for use with a small-sized tape cassette on a same recording/reproducing apparatus, wherein a recording medium tape accommodated in the new tape cassette is prevented from being damaged when a front lid of the new tape cassette provided for protecting the recording medium tape is opened.

2. Description of the Related Art

A tape cassette is known in which a lid is provided for protecting, when the tape cassette is not in use, a recording medium tape accommodated in the tape cassette at a portion exposed outside thereof.

For example, some video tape cassettes have a lid for protecting, when they are not in use, a magnetic tape accommodated in them at a portion exposed outside thereof.

FIGS. 23 through 25 show an example "a" of the above-mentioned video tape cassettes.

In the above-mentioned figures, a magnetic tape c is accommodated inside a cassette case b, wound around tape reels, not shown. A portion of the magnetic tape c is drawn outside the cassette case b. When the video tape cassette is not in use, this portion is positioned along the front of a recess d, known as a mouth of the tape cassette, formed at the center of the cassette case b and opens forward as well as upward and downward.

A lid e protects the portion of the magnetic tape c positioned along the front of the mouth d when the magnetic tape c is not in use. This lid is composed of a front lid f, a back lid g, and a top lid h.

The front lid f is swingably supported on the front portion of the cassette case b and formed to cover the front face of the magnetic tape c positioned along the front side of the mouth d when the lid is in the closed position.

The top lid h swingably couples at a front end thereof with the front lid f and engages at guided pins j, j protrusively provided on the inner face of a rear end of side portions i, i thereof with guide grooves k, k formed on the right and left side faces of the cassette case b. The top lid h is adapted to cover the top side of the magnetic tape c positioned along the front face of the mouth d when the lid is in the closed position.

The back lid g is swingably supported at a top end thereof on the lower center portion of the top lid h. And guided pins, not shown, formed on the lower end of the back lid g are slidably engaged with guide grooves, not shown, formed on right and left inner faces of the mouth d. The back lid g is formed to cover, when the lid is in the closed position, the rear face and lower side of the magnetic tape c positioned along the front side of the mouth d.

The above-mentioned lid e moves between the closed position indicated with a solid line of FIG. 23 and the open position indicated with a double dot & dash line of FIG. 23. The attitude of the top lid h while moving between the closed position and the open position is controlled by the movement of a swivel fulcrum at the front end of the front lid f produced when the front lid f swivels and the movement of the guided pins j, j along the guide grooves k, k.

A recording/reproducing apparatus on which both large-sized and small-sized tape cassettes may be used, or a compatible-type recording/reproducing apparatus is known. For example, such an apparatus is disclosed in European Application No. 94305073.2 (filed Jul. 11, 1994) by the same applicant as the present application. In the above-mentioned compatible-type recording/reproducing apparatus, parts and devices common to both large and small cassettes are used as far as possible to prevent the apparatus from getting complicated.

For example, to make common a tape pull-out member for drawing a recording medium tape out of a cassette case and to make common the movement of the tape pull-out member, a recess called a mouth in which the tape pull-out member is inserted when a tape cassette is loaded in the recording/reproducing apparatus is made generally common in size for large and small tape cassettes.

Also, a covering member called a lid is provided on the tape cassette to protect the recording medium tape at a portion exposed outside the tape cassette when the cassette tape is not in use.

The above-mentioned lid is in the closed position to protect the recording medium tape when the cassette tape is not in use. When the cassette tape is in use, the lid must be moved to the open position where the lid does not interfere with the travel of the recording medium tape.

The movement of the lid to the open position is provided by a lid opening member provided on the recording/reproducing apparatus.

However, for a tape cassette used together with a small tape cassette, if, as described above, the mouth is made generally the same for both large and small tape cassettes, the lid opening member for the small tape cassette passes in front of the large tape cassette. This requires to form a recess on the front portion of the large tape cassette to permit the passing of the lid opening member of the small tape cassette.

A recording/reproducing apparatus on which both large-sized and small-sized tape cassettes may be used, or a compatible-type recording/reproducing apparatus is known.

In the above-mentioned compatible-type recording/reproducing apparatus, parts and devices common to both large and small cassettes are used as far as possible to prevent the apparatus from getting complicated.

For example, to make common a tape pull-out member for drawing a recording medium tape out of a cassette case and to make common the movement of the tape pull-out member, a recess called a mouth in which the tape pull-out member is inserted when a tape cassette is loaded in the recording/reproducing apparatus is made generally common in size for large and small tape cassettes.

Also, a covering member called a lid is provided on the tape cassette to protect the recording medium tape at a portion exposed outside the tape cassette when the cassette tape is not in use.

The above-mentioned lid is in the closed position to protect the recording medium tape when the cassette tape is not in use. When the cassette tape is in use, the lid must be moved to the open position where the lid does not interfere with the travel of the recording medium tape.

The movement of the lid to the open position is provided by a lid opening member provided on the recording/reproducing apparatus.

However, for a tape cassette used together with a small tape cassette, if, as described above, the mouth is made generally the same for both large and small tape cassettes, the lid opening member for the small tape cassette passes in front of the large tape cassette. This requires to form a recess on the front portion of the tape cassette used together with the small tape cassette to permit the passing of the lid opening member of the small tape cassette.

An example of the above-mentioned tape cassette used together with a small-sized tape cassette is shown in FIGS. 30 through 32.

In the figures, reference numeral 101 indicates a tape cassette and reference numeral 102 indicates a cassette case of the tape cassette. A mouth 103 is formed on the center front of the cassette case 102. Further, tape exits 104, 104 are formed on both sides of the mouth 103.

A part of a magnetic tape 105 accommodated in the cassette case 102 is pulled out of the cassette case 102 at one of the tape exits 104, 104 to be positioned along the front of the mouth 103.

Reference numeral 106 indicates a front lid for protecting the portion of the magnetic tape 105 exposed out of the cassette case 102 when the cassette tape is not in use. In the front lid 106, a plate-shaped front portion 107 fully covering the front of the cassette case 102 is integrally formed with side portions 108, 108 projecting backward from both ends of the front portion 107. The side portions 108, 108 are swingably secured on the cassette case 102 at its sides toward its front end.

Reference numeral 109 indicates a recess formed at a position adjacent to the mouth 103 at the front end of a bottom wall 110 of the cassette case 102.

When the tape cassette 101 is loaded on the recording/reproducing apparatus, a lid opening member 111 provided on the recording/reproducing apparatus for a small tape cassette passes the recess 109 relatively, thereby preventing the lid opening member 111 from interfering with the loading of the tape cassette 101.

Reference numeral 112 indicates a closing projection protrusively provided on the front lid 106 at a position corresponding to the recess 109 when the lid is closed. The projection 112 is formed in a shape and a size that complement the recess 109.

Consequently, when the front lid 106 is in the closed position with the cassette tape being not in use, the closing projection 112 gets in the recess 109 of the cassette case 102 to close the recess 109 downward, thereby preventing dust and other undesired matter from penetrating from the recess 109 into the cassette case 102.

Related art: the following five applications filed by the same applicant as the present application are related to the present invention:

1. European unscreened publication No. 0599718 (publication date: Jun. 1, 1994).
2. European unscreened publication No. 0614185 (publication date: Sep. 7, 1994).
3. European application No. 94303699.6 (filing date: May 24, 1994).
4. Japanese application No. 05277302 (filing date: Oct. 12, 1993).
5. Japanese application No. 05313788 (filing date: Dec. 14, 1993).

Of the above-mentioned applications, Nos. 1, 2, 3 and 5 have been filed in the United States and Japan and No. 5 has been filed in the United States and Europe.

Now, turning to problems of the related art of the above-recited related applications, the above-mentioned conventional tape cassette requires to support the fulcrum pins e, e on brackets b, b, by bending the brackets b, b, resulting in a relatively low efficiency in assembly work.

In addition, if a force orthogonal to the axis of the fulcrum pins e, e is applied to a supported member d, the force is totally applied to the fulcrum pins e, e, thereby making it necessary for the fulcrum pins e, e to be relatively thick to ensure the mechanical strength of the fulcrum pins e, e. This, in turn, prevents tape cassette from being reduced in size.

Further, in the above-mentioned construction of the conventional tape cassette, if a relatively large interval cannot be provided between a member formed with a receiving portion and a member adjacent thereto, for example, if a back lid is swingably supported on the under face of a top lid lying over the top face of the cassette case when the lid is in the open position, a relatively large interval cannot be provided between the top lid and the top face of the cassette case. This makes it impossible to employ the construction itself shown in the figures.

With respect to the conventional viedo tape cassettes illustrated in FIGS. 23 through 25, another problem is a relatively poor efficiency in assembly work in engaging the guided pins j, j of the top lid h with the guide grooves k, k of the cassette case b of the aforementioned tape cassette a.

To be more specific, the above-mentioned engagement requires to make an interval between the guided pins j, j larger than an interval between external side faces of the cassette case b. To do so, the top lid h needs to be bent as shown in FIG. 25. Thus, engaging the guided pins j, j with the guide grooves k, k of the cassette case b while bending the top lid h significantly reduces the efficiency of assembly work.

Further, if the top lid h is bent as shown in FIG. 25, its ends formed with guided pins j, j get to the highest position and other portions get lower than the ends. Consequently, if any of the other portions abuts against the cassette case b, the guided pins j, j cannot be engaged with the guide grooves k, k.

If the above-mentioned the other portions that may interfere the above-mentioned engagement are removed from the cassette case b, portions m and n adjacent to an inner face l of the top lid h exist no longer when the lid is in the closed position. Consequently, if the top lid h is pressed downward, there is no portion that rigidly supports the pressing force, thereby easily bending the top lid h. The easy bending of the top lid h gives a user a feeling of lack of rigidity and permits penetration of foreign matter from a gap produced by the bending into the cassette case.

There is still another problem in the conventional tape cassette 101. That is, when the front lid 106 moves to the lid open position, the closing projection 112 provided on the front lid 106 may touch the magnetic tape 105 to damage it.

To be more specific, in the lid closed position, the closing projection 112 is positioned adjacent to the magnetic tape 105. When the front lid 106 moves from the closed position to the open position, an upper edge 112' moves very close to the magnetic tape 105 as indicated with a single dot & dash line 113 of FIG. 32.

Consequently, as shown with a solid line 114 of FIG. 31, the above-mentioned problem does not occur when the magnetic tape 105 is pulled up tight; but if the magnetic tape 105 is slack as indicated with a double dot & dash line 115 of FIG. 31, the upper edge 112' of the closing projection 112 may catch the magnetic tape 105 when the front lid 106 moves to the lid open position, thereby damaging the magnetic tape.

SUMMARY OF THE INVENTION

It is therefore an object of the present invention to provide a tape cassette wherein a fulcrum construction of the lid is formed with fulcrum pins and receiving portions for receiving and supporting the fulcrum pins. The receiving portions are made of elastic synthetic resin. Each receiving portion has a circular inner peripheral face for receiving a fulcrum pin, the inner peripheral face being partially notched to provide an introducing portion. The frontage of the introducing portion is slightly smaller than the external diameter of the fulcrum pin.

It is another object of the present invention to provide the tape cassette wherein each fulcrum pin is formed generally elliptic in cross section with the outer peripheral face notched at opposite sides around the axis. The frontage of the introducing portion of the receiving portion for receiving and supporting the fulcrum pin is slightly smaller than the interval between the notches formed on fulcrum pin.

It is still another object of the present invention to provide the tape cassette wherein the receiving portion is formed with the outer peripheral face spaced from the inner peripheral face at a constant interval. A member formed with the fulcrum pin is formed with a step opposite to the fulcrum pin. An interval between the fulcrum pin and the step is equal to or slightly larger than the interval between the inner peripheral and outer peripheral faces of the receiving portion. When the lid is assembled to the cassette case, a portion between the inner peripheral and outer peripheral faces of the receiving portion is positioned so that the portion is caught between the fulcrum pin and the step.

It is yet another object of the present invention to provide the tape cassette wherein the outside face of the cassette case formed with a guide groove is formed with slopes whose inner end is positioned near the guide groove and outer end reaches at least one side of the cassette. The slopes are tilted such that the interval between the slopes is larger at the inner end and smaller at the outer end.

It is a separate object of the present invention to provide the tape cassette wherein the inner face of a front lid is so formed with a rib or a projecting face in generally parallel with the recording medium tape when the lid is closed that the projection face is flush with the projecting end face of the closing projection.

In carrying out the invention and according to one aspect thereof, there is provided a tape cassette comprising a flat, box-like cassette case, a recording medium tape accommodated in the cassette case, and a lid for protecting, when the tape cassette is not in use, the recording medium tape at a portion exposed out of the cassette case, wherein a fulcrum of the lid is composed of a fulcrum pin and a receiving portion for receiving and holding the fulcrum pin, the receiving portion being made of an elastic synthetic resin and having a circular inner peripheral face for receiving the fulcrum pin, the inner peripheral face being partially notched for providing an introducing portion, and a frontage of the introducing portion being slightly smaller than an outer diameter of the fulcrum pin.

Consequently, in the tape cassette according to the present invention, abutting the fulcrum pin against the introducing portion of the receiving portion and then pressing the fulcrum pin into the receiving portion expands the introducing portion of the receiving portion due to elasticity of the material of which the receiving portion is made, thereby setting the fulcrum pin in the receiving portion. This setup makes extremely easy the work for having the fulcrum pin be supported in the receiving portion.

Further, because it is unnecessary for the receiving portion to be bent along the axis of the fulcrum pin when receiving the fulcrum pin, it is unnecessary to make relatively large the projection from the base from which the receiving portion is formed. This setup permits to form the receiving portion even in a situation where a relatively large gap cannot be provided between the base and other members.

Additionally, the receiving portion is formed with the outer peripheral face spaced from the inner peripheral face at a constant interval. A member formed with the fulcrum pin is formed with a step opposite to the fulcrum pin. An interval between the fulcrum pin and the step is equal to or slightly larger than the interval between the inner peripheral and outer peripheral faces of the receiving portion. When the lid is assembled to the cassette case, a portion between the inner peripheral and outer peripheral faces of the receiving portion is positioned so that the portion is caught between the fulcrum pin and the step. In this setup, if a force including a component orthogonal to the axis of the fulcrum pin is applied to the lid and if the force is directed toward the fulcrum pin, the above-mentioned step abuts against the outer peripheral face of the receiving portion, thereby preventing most of the above-mentioned force from applying to the fulcrum pin. Consequently, the strength of the fulcrum pin can be reduced as compared with a conventional fulcrum pin, thereby making the novel fulcrum pin smaller.

It should be noted that the shapes and constructions of the above-mentioned parts in the above-mentioned embodiment of the present invention are only a subset of examples and therefore do not limit the technological scope of the present invention.

In carrying out the invention and according to another aspect thereof, there is provided a tape cassette having a lid for covering and protecting, when the tape cassette is not in use, a recording medium tape at a portion thereof exposed out of a cassette case in which the recording medium tape is accommodated, the attitude of the lid moving between the closed position of the lid in which the recording medium tape is covered when the tape cassette is not in use and the open position of the lid in which the recording medium tape is exposed when the tape cassette is in use being controlled by slidably engaging a guided pin formed on the lid at each of the opposite sides thereof with a guide groove formed on an outside face of the cassette case, wherein slopes are formed on the outside face on which the guide groove is formed, the inner end of each of the slopes being positioned in the vicinity of the guide groove, the outer end of each of the slopes reaching at least one of the sides of the cassette case, and an interval between the slopes is large at the inner ends thereof and small at the outer ends thereof.

Consequently, in the tape cassette according to the present invention, when the guided pins of the lid are aligned with the slopes from sides at which the outer ends of the slopes are positioned, tops of the guided pins are abutted against the outer ends of the slopes, and, in this state, the lid is pressed toward the inner ends of the slopes, the guided pins move along the slopes to be eventually engaged in the guide grooves. Meanwhile, as the guided pins runs along the slopes to their inner ends, the guided pins are applied with a force that parts the guided pins from each other. Consequently, the lid is bent without especially applying a lid bending force to have the guided pins be received in the guide grooves, thereby enhancing the efficiency of the assembly work significantly.

In addition, since the assembly work does not require to greatly bend the lid as before, a portion adjacent to the inner face of the lid when the lid is closed can be formed on the cassette case. This portion receives the force applied to the lid to prevent the lid from being bent unnecessarily, thereby preventing foreign matter from getting into the cassette case.

It should be noted that the shapes and constructions of the above-mentioned parts in the above-mentioned embodiment of the present invention are only a subset of examples and therefore do not limit the technological scope of the present invention.

In carrying out the invention and according to still another aspect thereof, there is provided a tape cassette for use with a small-sized tape cassette on a same recording/reproducing apparatus, wherein a front lid is swingably secured on a cassette case, the front lid covering and protecting, when the tape cassette is not in use, a recording medium tape at a portion exposed out of the cassette case in which the recording medium tape is accommodated, the cassette case is formed at the front section thereof with a recess through which a lid-opening member passes, the lid-opening member being provided on the recording/reproducing apparatus for opening a front lid of the small-sized tape cassette, the front lid is formed at the inner face thereof with a closing projection to be engaged with the recess, and the front lid is further formed at the inner face thereof with a rib or a projected face being flush with a projected end face of the closing projection, the rib being positioned generally in parallel with the recording medium tape when the front lid is closed.

Consequently, in the tape cassette according to the present invention, even if the recording medium tape is slack, the lower edge of the recording medium tape slides along the rear edge or the rib or the projected face when the front lid moves to the lid open position and passes down the portion of the closing projection without being caught by the upper edge of the closing projection. Therefore, the recording medium tape is not damaged.

It should be noted that the shapes and constructions of the above-mentioned parts in the above-mentioned embodiment of the present invention are only a subset of examples and therefore do not limit the technological scope of the present invention.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 11 is an enlarged cross section illustrating a state continued from FIG. 10;

FIG. 32 is an enlarged cross section of the front portion of the conventional tape cassette of FIG. 31.

DETAILED DESCRIPTION OF PREFERRED EMBODIMENTS

Figure 1:
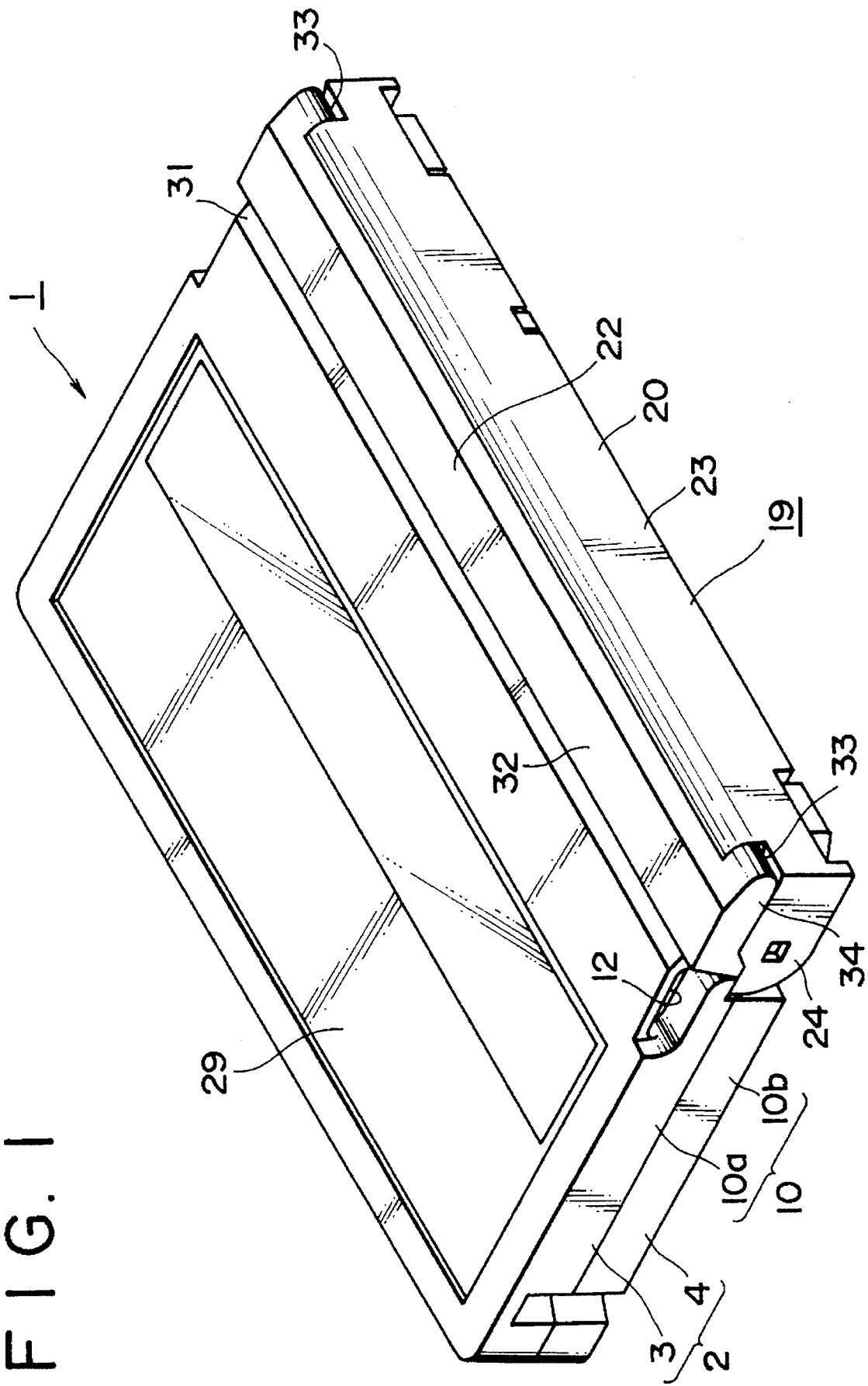
FIG. 1 is a perspective view illustrating the tape cassette practiced as one preferred embodiment of the present invention.

This invention will be described in further detail by way of example with reference to the accompanying drawings and the preferred embodiment of the invention shown by the drawings. In this embodiment, the present invention is applied to a video tape cassette referred to by reference numeral 1 (FIG. 1).

Reference numeral 2 indicates a cassette case made of synthetic resin. The cassette case, flat and box-like, is composed of an upper half member 3 and a lower half member 4 abutted against each other for coupling.

Figure 2:
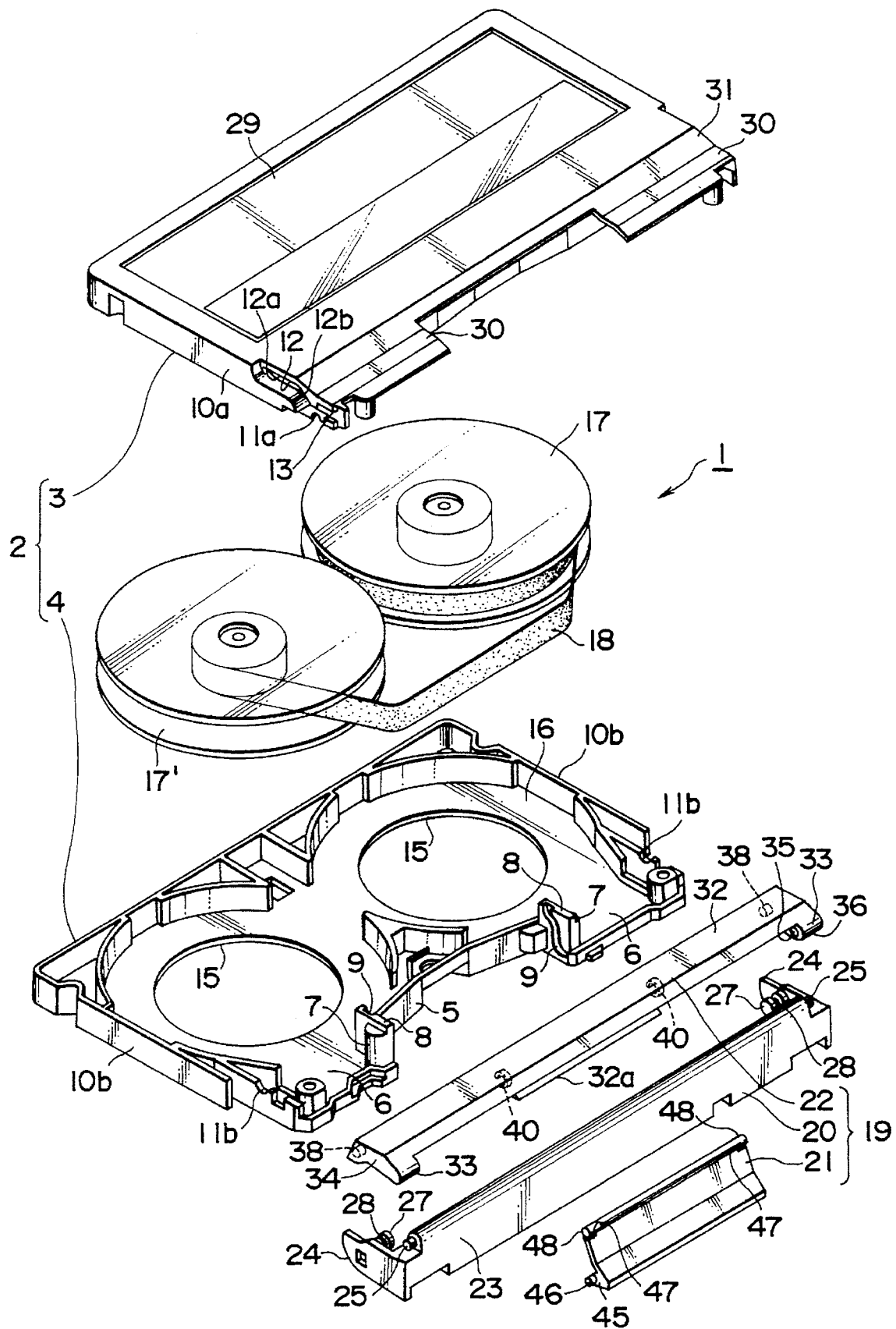
FIG. 2 is an exploded perspective view of the embodiment of FIG. 1.
Figure 3:
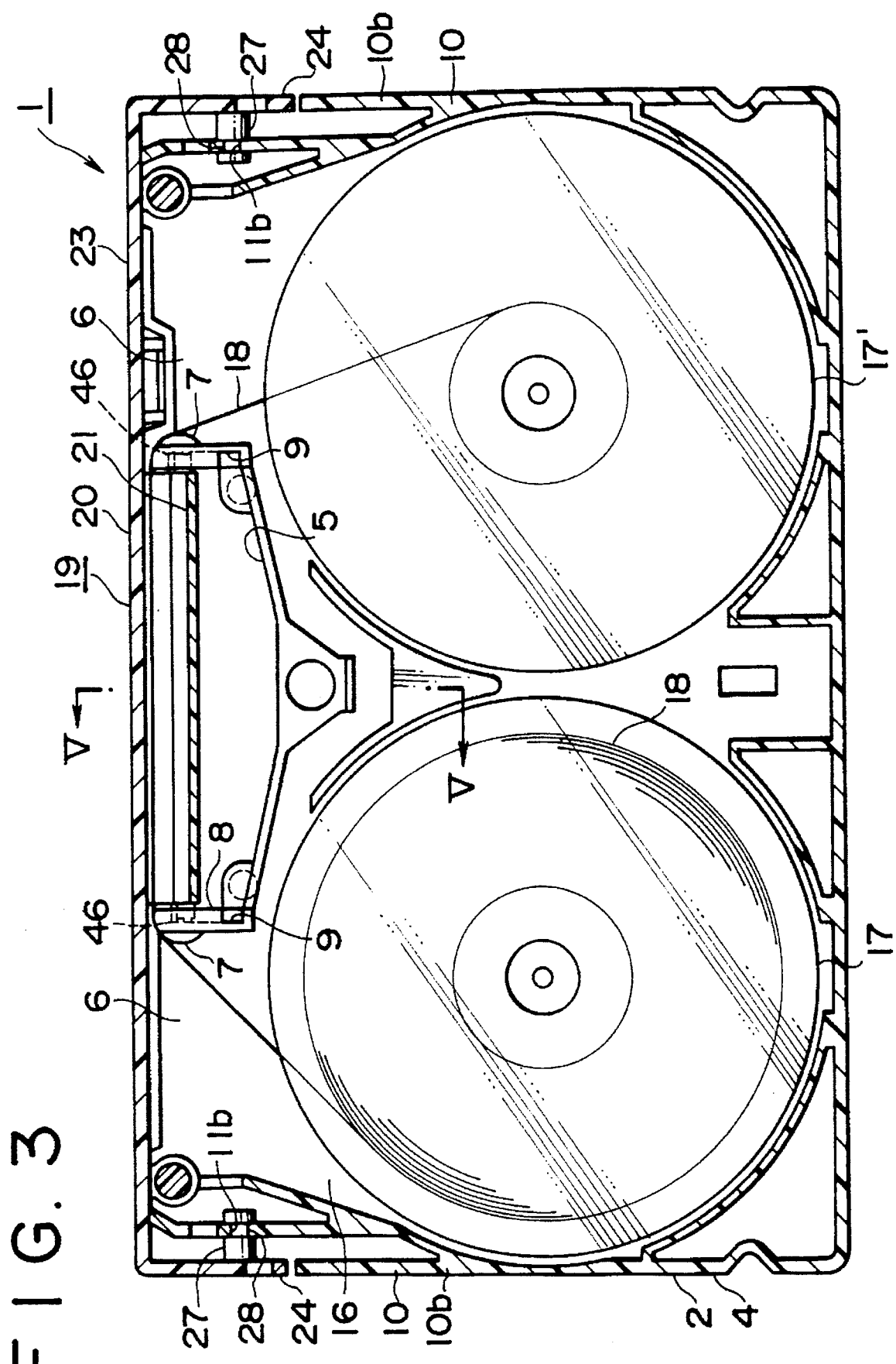
FIG. 3 is a horizontal cross section of the embodiment of FIG. 1.
Figure 4:
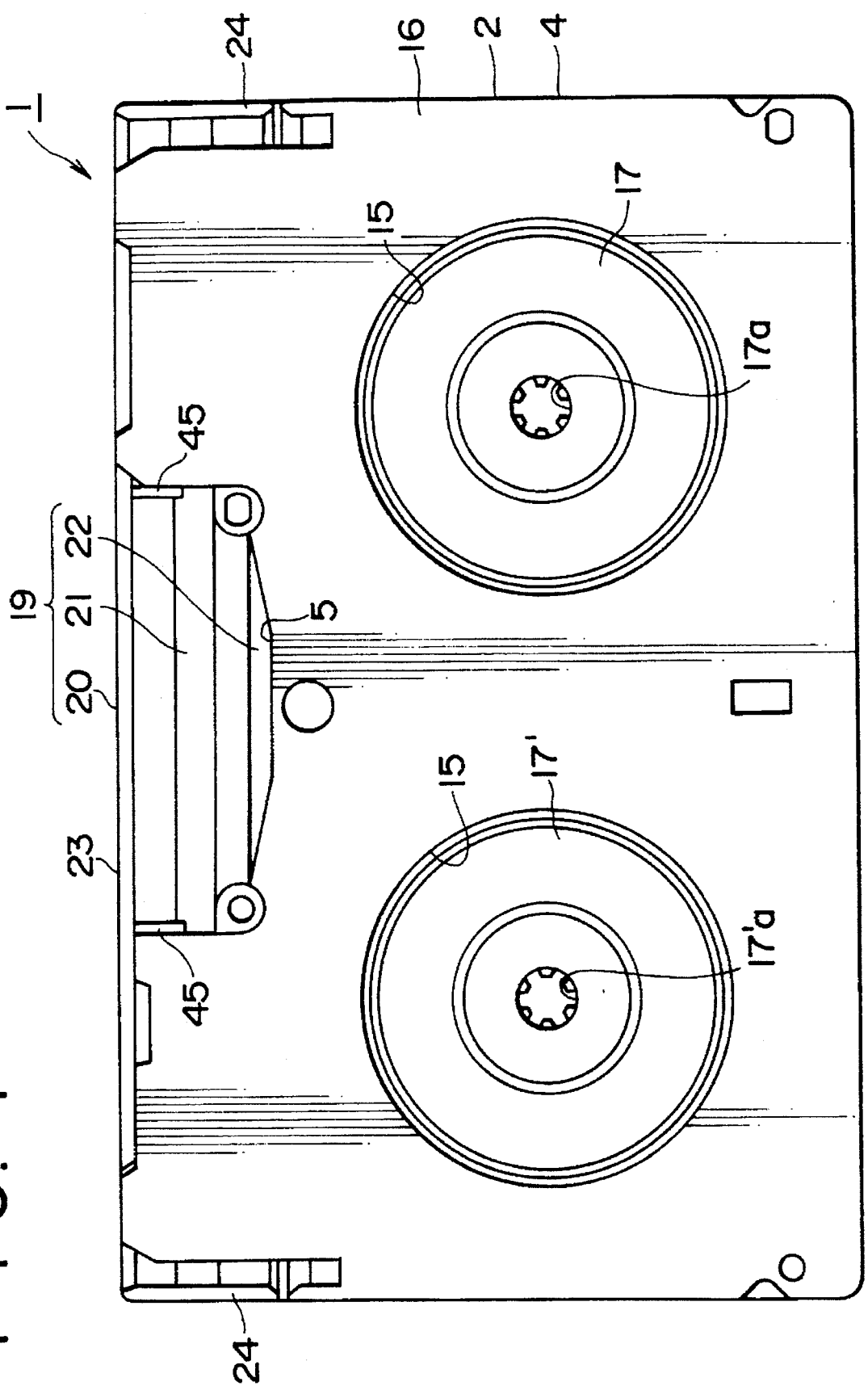
FIG. 4 is a bottom view of the embodiment of FIG. 1.

Reference numeral 5 (FIG. 2) indicates a mouth formed on the cassette case 2 at its front center, the mouth being open to up and down and to the front.

On both sides of the mouth 5 in the front of the cassette case 2, there are tape exits 6, 6. Each tape exit 6 is formed with a tape guide 7 on the side of the 5.

Reference numerals 8, 8 indicate mouth side walls that define both sides of the mouth 5. The mouth side walls 8, 8 are formed at opposite faces with guide grooves 9, 9 that extend up and down in a long generally "S" letter.

Side walls 10, 10 of the cassette case 2 are formed at their front ends with support holes 11, 11 for supporting a lid to be described. The side walls are also formed at their outer faces behind the support holes 11, 11 with guide grooves 12, 12.

The support holes 11, 11 are formed by generally semicircular notches 11a, 11a provided on the under edges of side walls 10a, 10a of the upper half member 3 and generally semicircular notches 11b, 11b provided on the upper edges of side walls 10b, 10b of the lower half member 4.

The guide grooves 12, 12 are formed on the side walls 10a, 10a of the upper half member 3 at their outer faces.

About ⅔ portions 12a, 12a of the guide grooves 12, 12 extend generally horizontally along the upper edges of the side walls 10a, 10a and remaining about ⅓ portions 12b, 12b continue at their rear ends to the front ends of the horizontally portions 12a, 12a and at their front ends reach down the lower ends of the side walls 10a, 10a.

Reference numerals 13, 13 indicate slopes formed to extend on the side walls 10a, 10a of the upper half member 3 at their front ends in the front and rear directions of the upper half member. Rear ends of the slopes 13, 13, namely inner ends, are positioned near portions toward the lower end of the tilts 12b, 12b of the guide grooves 12, 12, while front ends, namely outer ends, reach the front ends of the side walls 10a, 10a.

The slopes 13, 13 are tilted such that the slopes are positioned at their rear ends on the same surface as the outer faces of the side walls 10a, 10a and, at their front ends, inside from the outer face of the side walls 10a, 10a. Namely, the slopes 13, 13 are tilted so that both approach to each other as they approach their front ends.

Reference numerals 15, 15 are holes formed at the right and left around generally the center of a bottom wall 16 of the cassette case 2 in the front and rear direction.

Reference numerals 17, 17' indicate tape reels rotatably and separately accommodated in the cassette case 2 at right and left sides. A magnetic tape 18 is fixed at both ends on the tape reels 17, 17' and wound around them. Reel base engaging holes 17a, 17'a opening in the lower end faces of the tape reel 17, 17' face downward from the holes 15, 15.

The magnetic tape 18 is partially drawn out of the tape exits 6, 6 from the cassette case 2 around the cassette guides 7, 7 to run along the front of the mouth 5.

Reference numeral 19 indicates a lid for protecting the magnetic tape 18 when the cassette tape is not in use.

The lid 19 is composed of a front lid 20 that covers the magnetic tape 18 at the front side of the portion exposed out of the cassette 2 and covers the front of the tape exits 6, 6, a back lid 21 that covers the rear side of the magnetic tape 18 in the mouth 5, and a top lid 22 that covers the top portion of the mouth 5. The lids 20, 21, and 22 are each made of elastic synthetic resin.

The front lid 20 is integrally formed by a plate-like front section 23 that fully covers about all the front face of the cassette case 2 and side portions 24, 24 projecting backward from left and right side edges of the front section 23. The front section 23 is notched at upper edges of right and left ends. Fulcrum pins 25, 25 are protrusively provided on the notches at faces toward right and left sides.

The fulcrum pins 25, 25 are formed generally elliptically in cross section, each being chamfered at opposite sides in parallel to each other along its axis. The parallel chamfered faces 26, 26 are tilted downward at about 40 degrees.

Swivel shafts 27, 27 are protrusively provided on the front lid 20 at sides 24, 24 near the upper edges and slightly back away from the center in the front and rear directions of the front lid. The swivel shafts 27, 27 are formed with engaging grooves 28, 28 around outer peripheries near tops of the shafts.

The front lid 20 thus constituted is secured on the cassette case 2 swingably up and down with the engaging grooves 28, 28 of the swivel shafts 27, 27 engaged with openings of the above-mentioned support holes 11, 11 of the cassette case 2.

The top lid 22 is integrally formed by a generally plate-like main section 32 that covers front ends 30, 30 of a top plate 29 of the cassette case 2, the mouth 5, and portions except the rear end of a tilt portion 31 continuing back from the front ends 30, 30 of the top plate 29, linking portions 33, 33 projecting forward from the front ends of both ends of the main section 32, and side walls 34, 34 that go down from the outer end edge of the main section 32 to be linked at their front ends to the linking portion 33, 33. Reference numeral 32a indicates a rib that is narrow in up and down directions and is provided downward from the central portion of the front edge of the main section 32. The width in the right and left directions of the rib is slightly smaller than the right and left width of the mouth 5.

The linking portions 33, 33 provide receiving portions for receiving the above-mentioned fulcrum pins 25, 25 of the front lid 20. The linking portions 33, 33 are formed at their inner end faces or opposite faces with supported holes 35, 35. Peripheral walls 36, 36 around the supported holes 35, 35 are shaped generally a letter "C" of which openings 37, 37 face down and slightly forward when the main section 32 is held horizontal.

A frontage 37a of the opening 37 is slightly smaller than an interval 26a between planes 26, 26 of the fulcrum pin 25. An interval between generally elliptic arcs of the fulcrum pins 25, 25 is generally equal to or slightly smaller than the inner diameter of inner peripheries 35a, 35a of the supported holes 35, 35 of the top lid 22.

On the inner faces or opposite faces of in the rear ends of the side walls 34, 34, guided pins 38, 38 are disposed protrusively. Top faces 39, 39 of the guided pins 38, 38 are tilted such that the top faces 39, 39 approach the wide walls 34, 34 as the top faces go toward the rear end, or the top faces part from each other as they go toward the rear end.

Reference numerals 40, 40 indicate support pieces spacedly disposed in the right and left directions at generally the center of the front and rear direction near the center of the lower face of the main section 32. The support pieces 40, 40 are projected downward in generally an arc. The support pieces 40, 40 and a portion of the main section 32 opposite to the support pieces together form a receiving section that receives a fulcrum pin of the back lid 21 to be described. This receiving section is formed with support holes 41, 41 having openings at lower rear portions. The support holes 41, 41 are generally circular. The frontage of the openings 42, 42 is slightly smaller than the inner diameter of the support holes 41, 41.

Outer peripheral faces 43, 43 around the support pieces 40, 40 extend in an arc parallel to inner peripheral faces 41a, 41a of the support holes 41, 41. Between the outer peripheral faces 43, 43 and the support holes 41, 41, abutting portions 44, 44 uniform in thickness in the peripheral direction are formed.

The fulcrum pins 25, 25 of the front lid 20 are swingably mated with the supported holes 35, 35 of the top lid 22, thereby swingably linking the front end of the top lid to the top end of the front section 23 of the front lid 20. This linking is performed as follows.

Figure 12A:
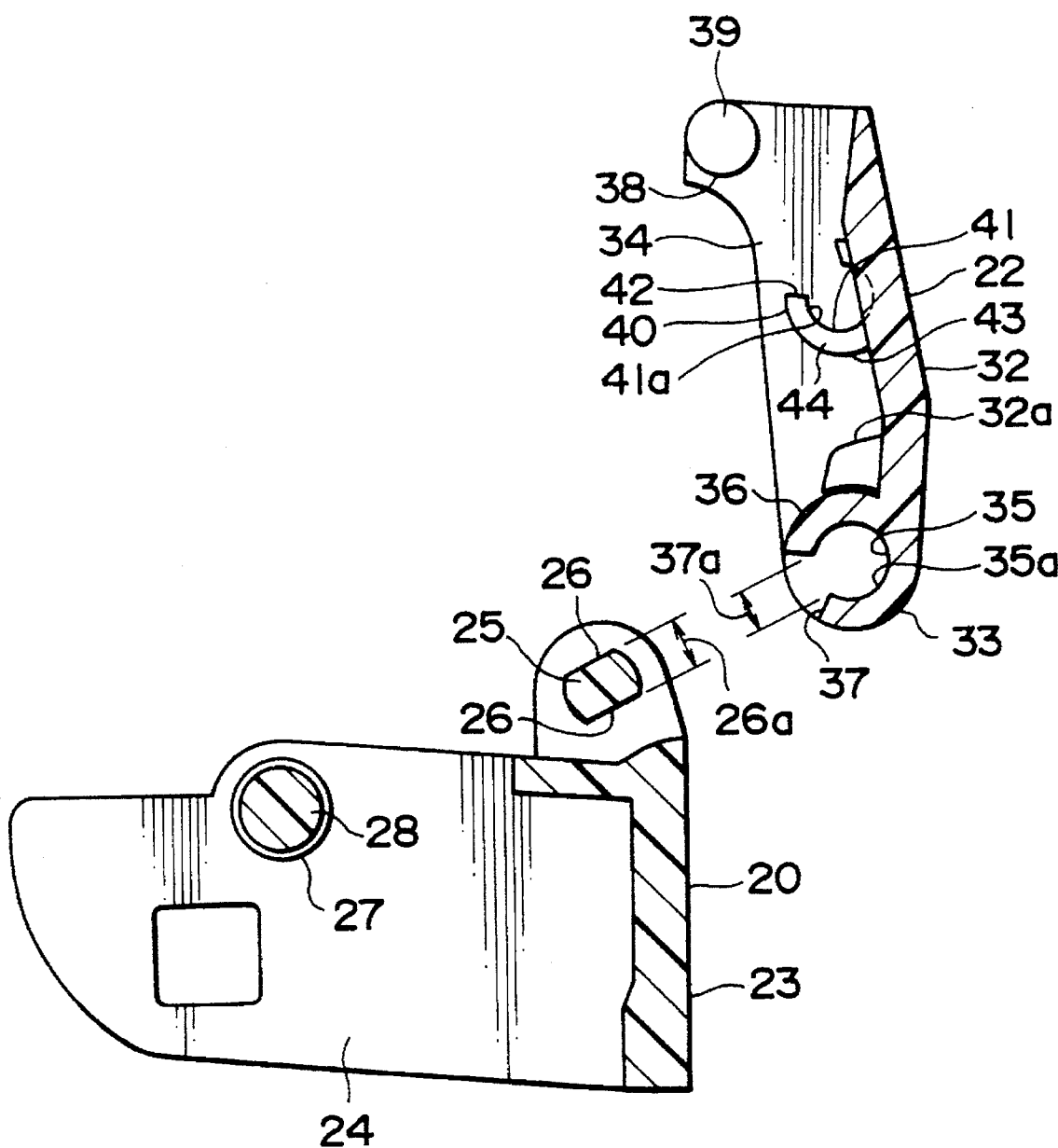
FIG. 12A and FIG. 12B are enlarged cross sections of a main section illustrating the procedure for coupling the top lid with the front lid, FIG. 12A indicating a coupled state and FIG. 12B indicating a state in which the tape cassette is in use.
Figure 12B:
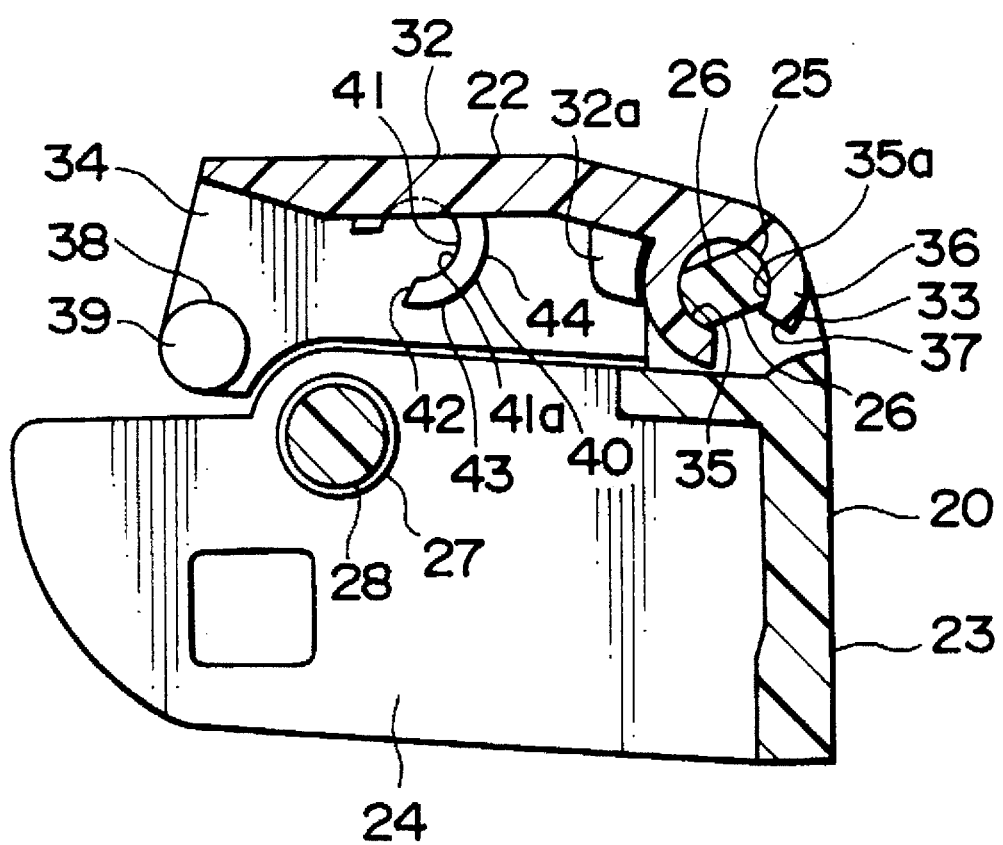

As shown in FIG. 12A, the top lid 22 is held generally vertically with its front end down. The openings 37, 37 of the supported holes 35, 35 are opposed to the front ends of the fulcrum pins 25, 25 of the front lid 20 and rightly opposed to the extension of the planes 26, 26 of the fulcrum pins 25, 25. In this state, the linking sections 33, 33 of the top lid 22 are pressed onto the fulcrum pins 25, 25 of the front lid 20. The pressing force slightly expands the openings 37, 37 of the supported holes 35, 35, thereby making the fulcrum pins 25, 25 be received in the supported holes 35, 35.

Then, the guided pins 38, 38 of the top lid 22 are slidably engaged with the guide grooves 12, 12 formed on the cassette case at the front end of the side wall.

When engaging the guided pins 38, 38 with the guide grooves 12, 12, the top faces of 39, 39 of the guided pins 38, 38 are first abutted against the front ends of the slopes 13, 13 formed on the side walls 10, 10 of the cassette case 2 and, in this state, the guided pins 38, 38 are pressed toward the rear end of the slopes 13, 13. Then, since the interval between the slopes 13, 13 is formed such that the interval gets larger toward the back of the slopes, the top lid 22 is slightly bent outward to expand the interval between the guided pins 38, 38. Consequently, the guided pins 38, 38 reach along the slopes 13, 13 up to their back ends and then slide along the outer faces of the side walls 10, 10 to be engaged with the guide grooves 12, 12.

Thus, simply abutting the top faces 39, 39 of the guided pins 38, 38 against the front ends of the slopes 13, 13 and then pressing the guided pins 38, 38 onto the back ends of the slopes 13, 13 can engage the guided pins 38, 38 with the guide grooves 12, 12, thereby significantly enhancing the efficiency of the assembly work. Also, as shown in the above-mentioned embodiment, if the top faces 39, 39 of the guided pins 38, 38 are tilted such that the top faces approach the side walls 34, 34 as the top faces go to the rear ends of the slopes, the top faces 39, 39 can be abutted against the front ends of the slopes 13, 13 without bending the top lid 22, thereby further enhancing the efficiency of the assembly work.

The back lid 21 is a rectangular plate whose length is generally equal to the width of the mouth 5. From both ends of the lower portion of the back lid, projecting pieces 45, 45 extend backward. From the outer faces of the rear ends of the projecting pieces 45, 45, guided pins 46, 46 extend.

The upper edge of the back lid 21 is formed into a generally round rod-like shape. Notches 47, 47 are formed on the back lid 21 at both side edges and near its top end. The notches 47, 47 provide fulcrum pins 48, 48 on both side edges of the top end. The outer diameter of the fulcrum pins 48, 48 is generally equal to or slightly smaller than the inner diameter of the above-mentioned support holes 41, 41 of the top lid 22. The interval between the fulcrum pins 48, 48 and upper edges 47a, 47a of the notches 47, 47 is slightly larger than the thickness of the above-mentioned abutting portions 44, 44 of the top lid 22.

The fulcrum pins 48, 48 of the back lid 21 are swingably mated with the support holes 41, 41 of the top lid 22, thereby making the top end of the back lid 21 be swingably supported on the main section 32 of the top lid 22 at its under face. This supporting is made as follows.

Figure 13A:
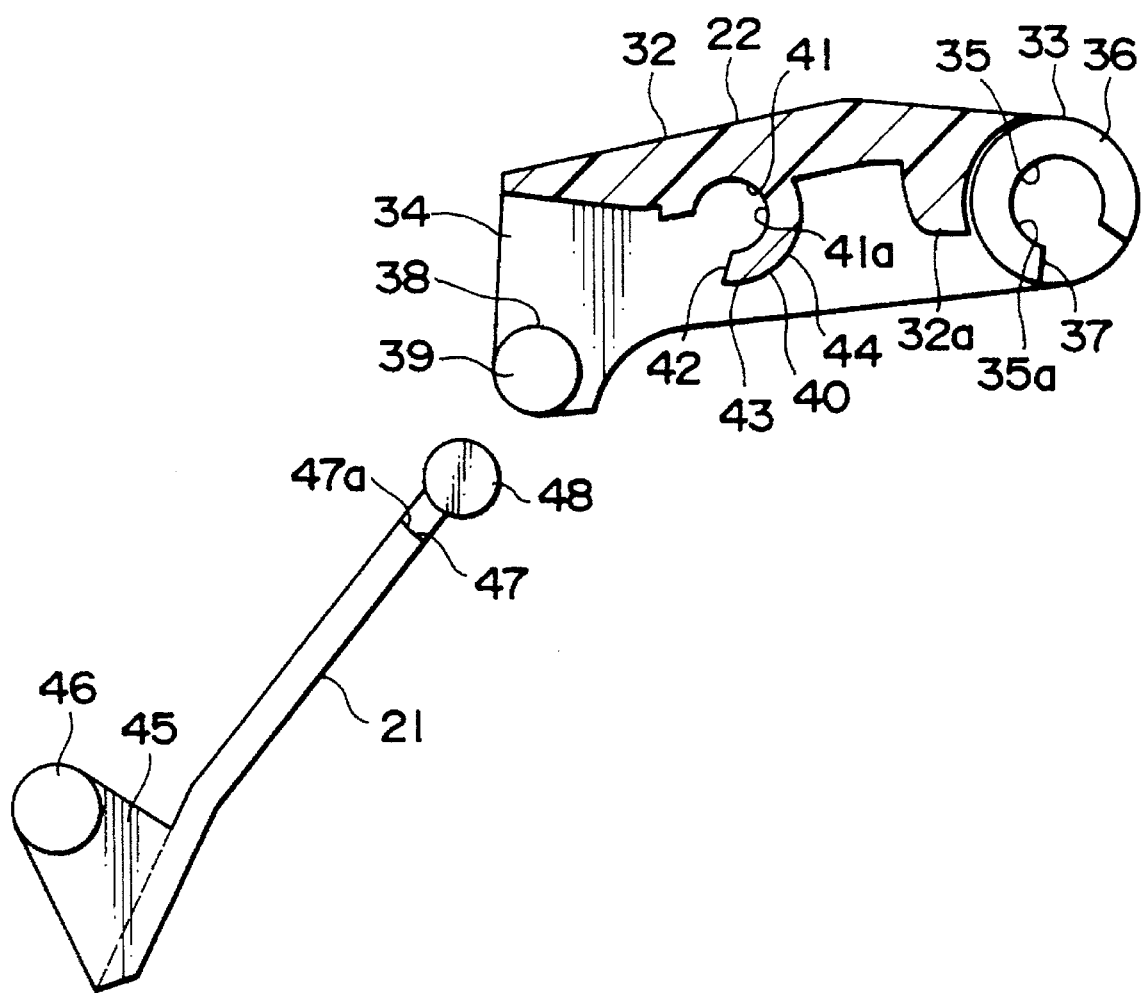
FIG. 13A and FIG. 13B are enlarged cross sections of the main section illustrating the procedure for coupling the back lid with the top lid, FIG. 13A indicating a coupled state and Fig, 13B indicating a state in which the tape cassette is in use.

First, as shown in FIG. 13A, with the back lid 21 tilted forward, the fulcrum pins 48, 48 are abutted against the openings 42, 42 of the support holes 41, 41 of the top lid 22. In this state, the fulcrum pins 48, 48 of the back lid 21 are pressed toward the support holes 41, 41. This expands the openings 42, 42 of the support holes 41, 41 to make the fulcrum pins 48, 48 be received in the support holes 41, 41.

Then, the guided pins 46, 46 of the back lid 21 are slidably engaged with the guide grooves 9, 9 formed on the side walls 8, 8 of the mouth of the cassette case 2.

Consequently, the lid 19 composed of the front lid 20, the back lid 21, and the top lid 22 moves between the closed position and the open position of the cassette case 2.

Figure 5:
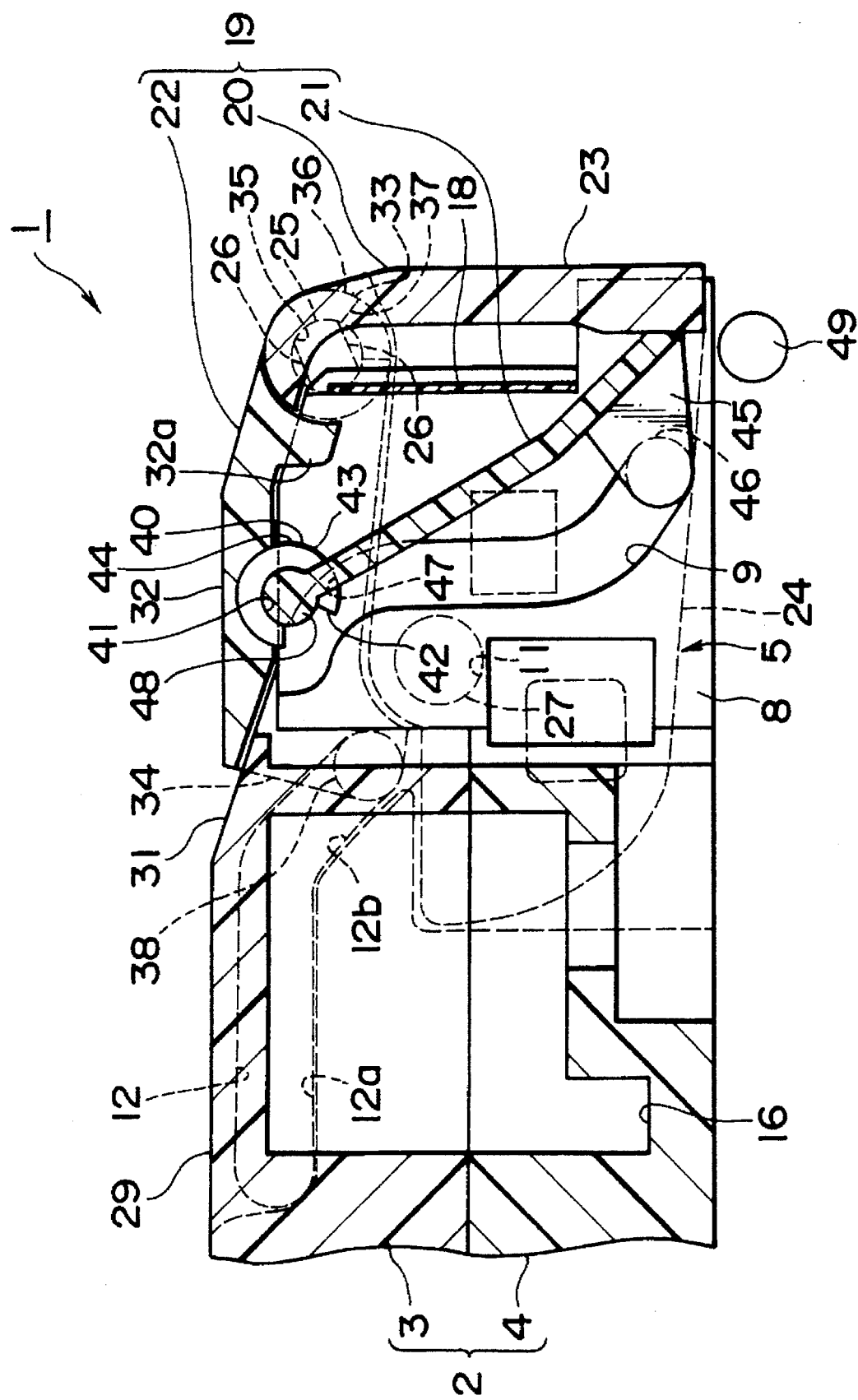
FIG. 5 is an enlarged cross section of FIG. 3 along line V—V.

In the state shown in FIG. 5, the lid 19 is in the closed position. In this state, the front section 23 of the front lid 20 covers the front face of the cassette case 2 and the front side of the magnetic tape 18 at the portion exposed out of the cassette case 2. It should be noted that the front lid 20 is pressed toward the closing position by a spring, not shown.

When the lid 19 is in the closed position, the guided pins 46, 46 of the back lid 21 are positioned at the lower ends of the guide grooves 9, 9. In the mouth 5, the back lid 19 is positioned in a tilted manner behind the magnetic tape 18, the lower end of the back lid abutting against the rear face of the front section 23 of the front lid 20, thereby covering, in cooperation with the front section 23 of the front lid 20, the magnetic tape 18 at the portion positioned in the mouth 5 except the upper part of the portion.

Figure 13B:
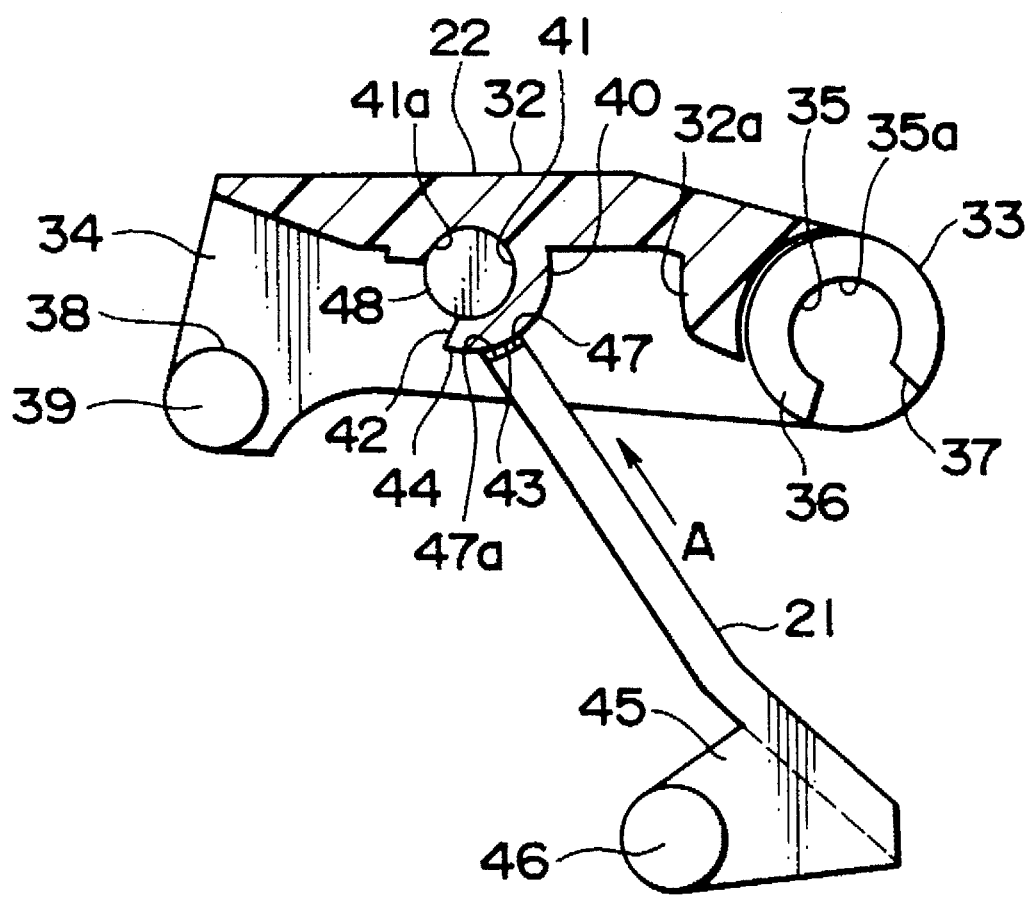

In this state, the back lid 21 abuts or adjoins, at the upper edges 47a, 47a of the its notches 47, 47, the outer peripheral faces 43, 43 of the support pieces 40, 40 of he top lid 22 (FIG. 13B), the abutting portions 44, 44 being placed between the fulcrum pins 48, 48. Therefore, if a force indicated by an arrow A shown in FIG. 13B is applied to the back lid 21 for example, the force is received by abutting of the upper edges 47a, 47a of the notches 47, 47 against the outer peripheral faces 43, 43 of the support pieces 40, 40, thereby preventing undue force from applying to the fulcrum pins 48, 48 from.

The guided pins 38, 38 of the top lid 20 are positioned at the front ends of the guide grooves 12, 12 of the cassette case 2 and the main section 32 of the top lid 20 is positioned so that the main section covers the front ends of the top plate 29 of the cassette case 2 as well as the top of the mouth 5. Thus, the top lid 20 covers the magnetic tape 18 at the upper part of the portion positioned in the mouth 5.

Consequently, in the state in which the lid 19 is in the closed position, the portion of the magnetic tape 18 positioned in the mouth 5 is completely covered by the front section 23 of the front lid 20, the back lid 21, and the main section 32 of the top lid 22.

It should be noted that the center portion of the front section 23 of the front lid 20 is corresponding to the mouth 5 and, if the center portion is pressed from the front, there is nothing to withstand the pressure. However, as mentioned earlier, the rib 32a projecting downward from the front edge of the main section 32 of the top lid 22 can be positioned immediately behind the top end of the center portion to withstand the pressure, thereby enhancing the strength of the lid 19 at this portion.

In the above-mentioned tape cassette 1, the front ends 30, 30 and the tilt portion 31 of the top plate 29 of the cassette case 2 are positioned immediately under the inner face of the main section 32 of the top lid 22 in the closed position, so that, if the main section 32 is pressed from the top to bend downward, the bend is withstood by the front ends 30, 30 and the tilting portion 31 of the top plate 29, thereby preventing the main section 32 of the top lid 22 from being bent too much. Thus, the dust-proof of the cassette case is ensured.

When the tape cassette 1 mentioned above is loaded on a video tape recorder, a lid opener 49 provided on the video tape recorder abuts against the lower edge of the side face 24 of the front lid 20 when the cassette tape 1 goes down to a predetermined cassette loader. And the lid opener 49 relatively pushes up the lower edge of the side face 24. Consequently, the front lid 20 swings toward the lid open position as shown in FIG. 6 against the lid-closing force given by the aforementioned spring, not shown.

Figure 6:
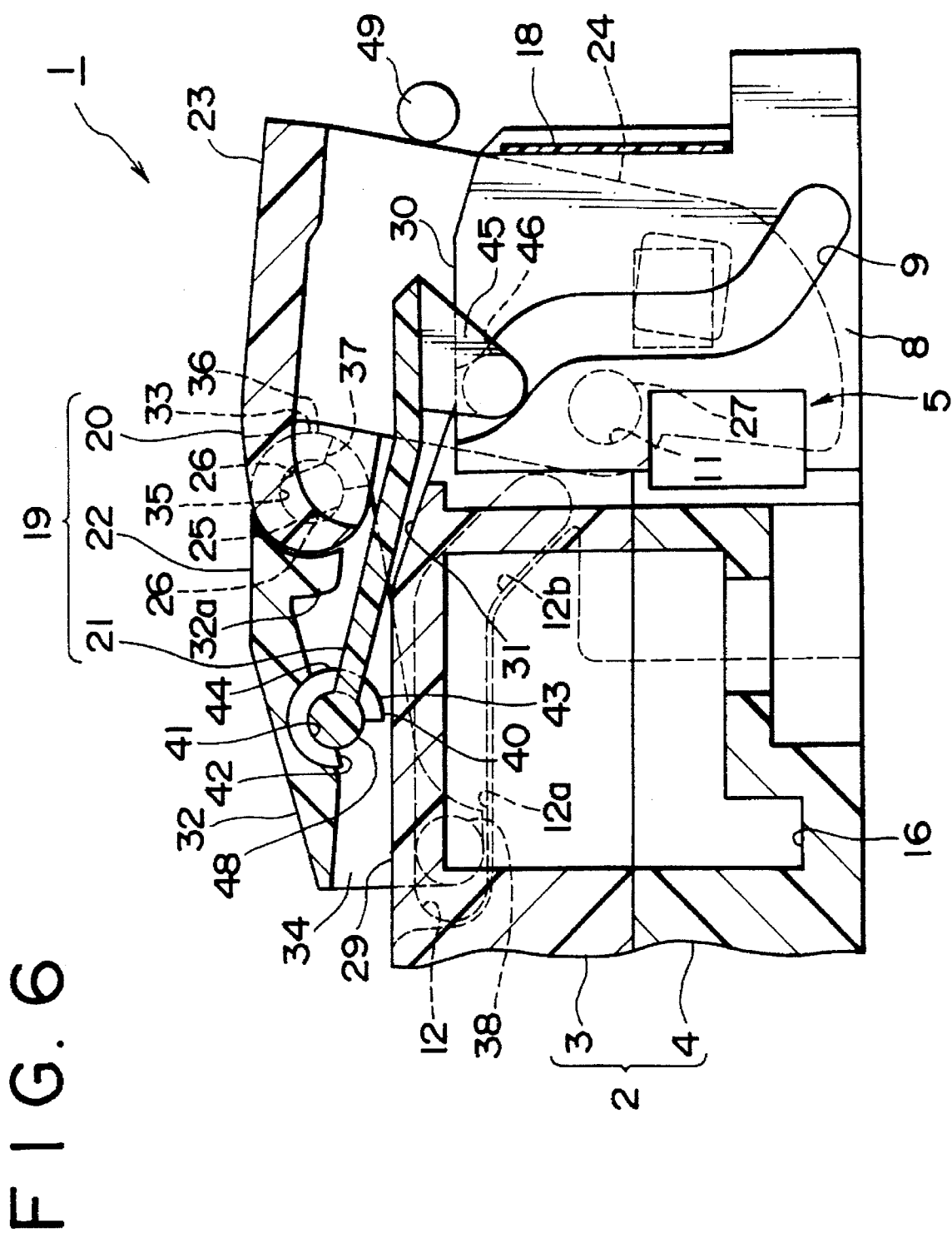
FIG. 6 is an enlarged cross section along line V—V of FIG. 5 when the lid is in the open position.
Figure 7:
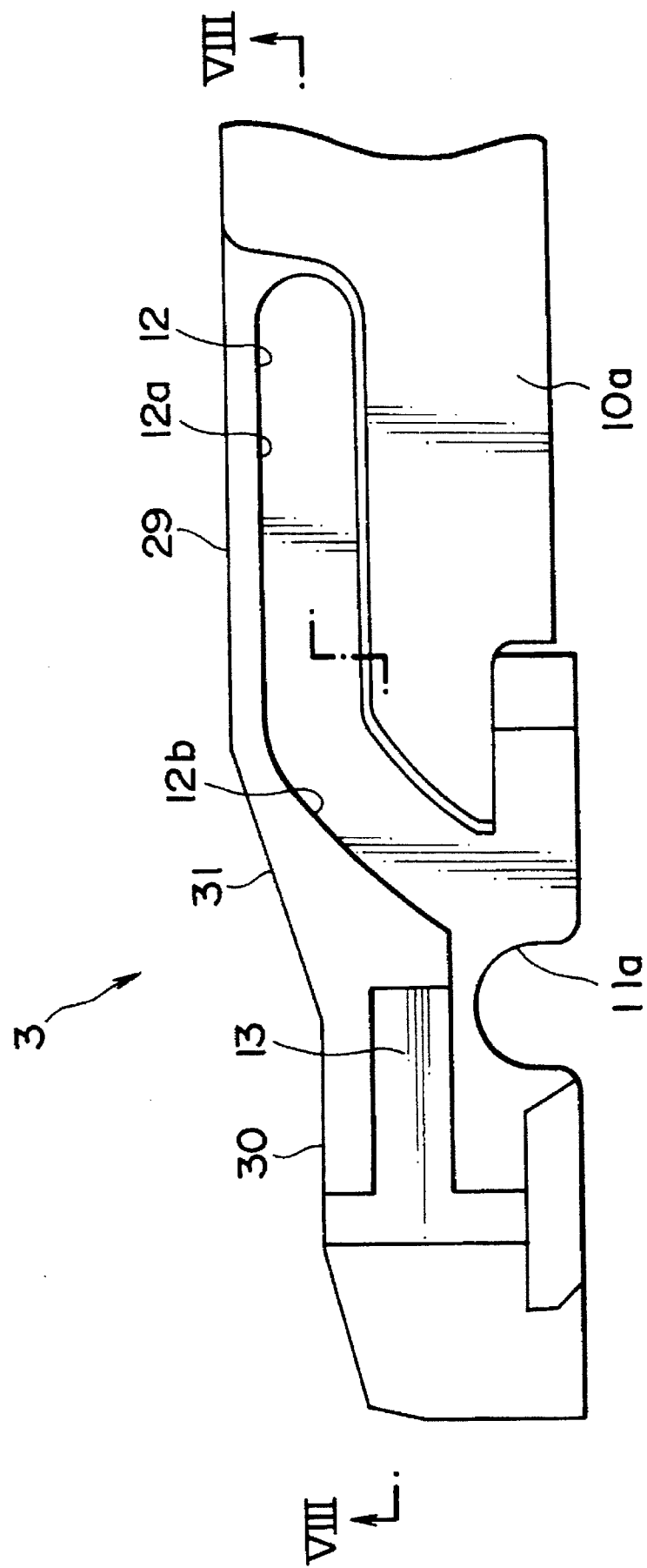
FIG. 7 is an enlarged side view of the front end of the upper half member.
Figure 8:
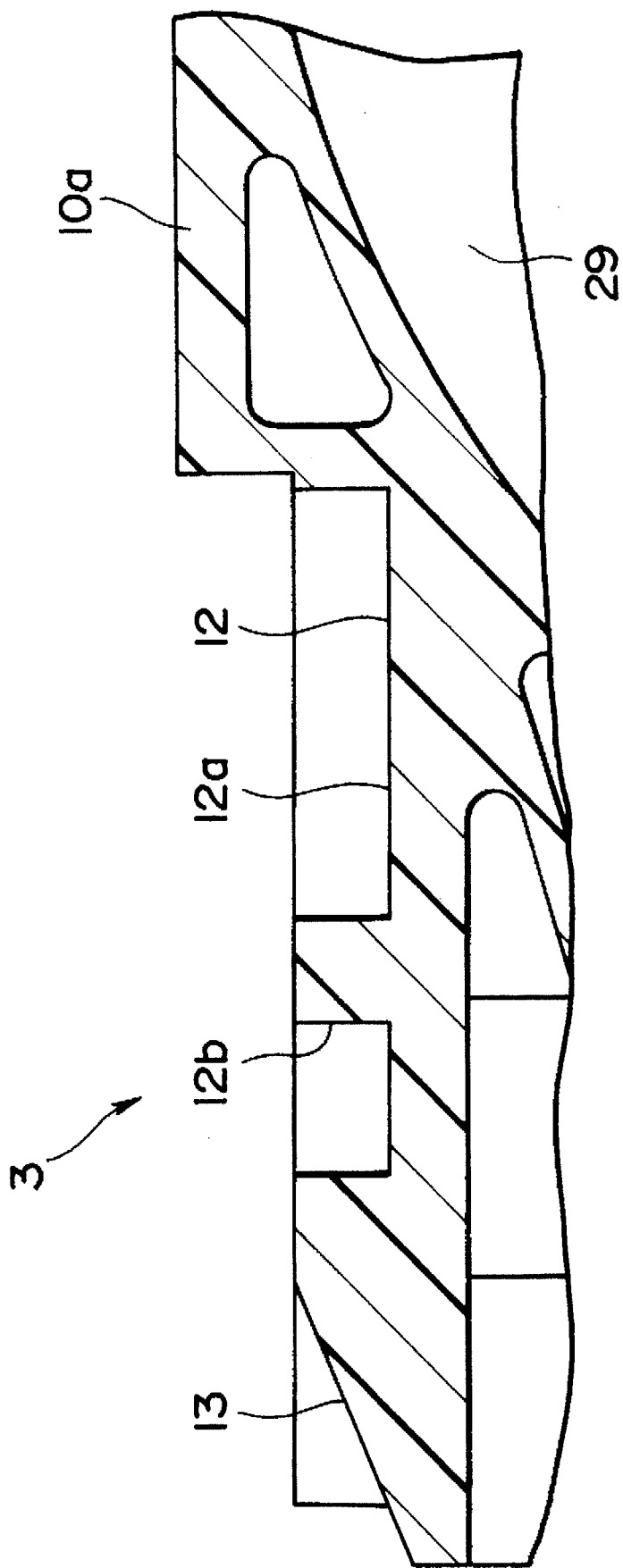
FIG. 8 is a cross section along line VIII-VIII of FIG. 7.

When the front lid 20 swings toward the lid-opening position, the back lid 21 and the top lid 22 also move to the closed position of FIG. 5 to the open position of FIG. 6. In what follows, changes in the attitudes of the lids 20, 21, and 22 are described with reference to FIGS. 9 through 11.

As seen from the changes in the attitudes of the lids, the abutting portions 44, 44 of the top lid 22 are always positioned between the upper edges 47a, 47a of the notches 47, 47 of the back lid 21 and the fulcrum pins 48, 48, so that little undue force is applied to the fulcrum pins 48, 48 and therefore there is no apprehension in the strength of the fulcrum pins 48, 48. Further, because little force that moves the fulcrum pins 48, 48 toward the openings 42, 42 of the support holes 41, 41 is applied, there is no apprehension that the fulcrum pins 48, 48 come off the support holes 41, 41.

Figure 9:
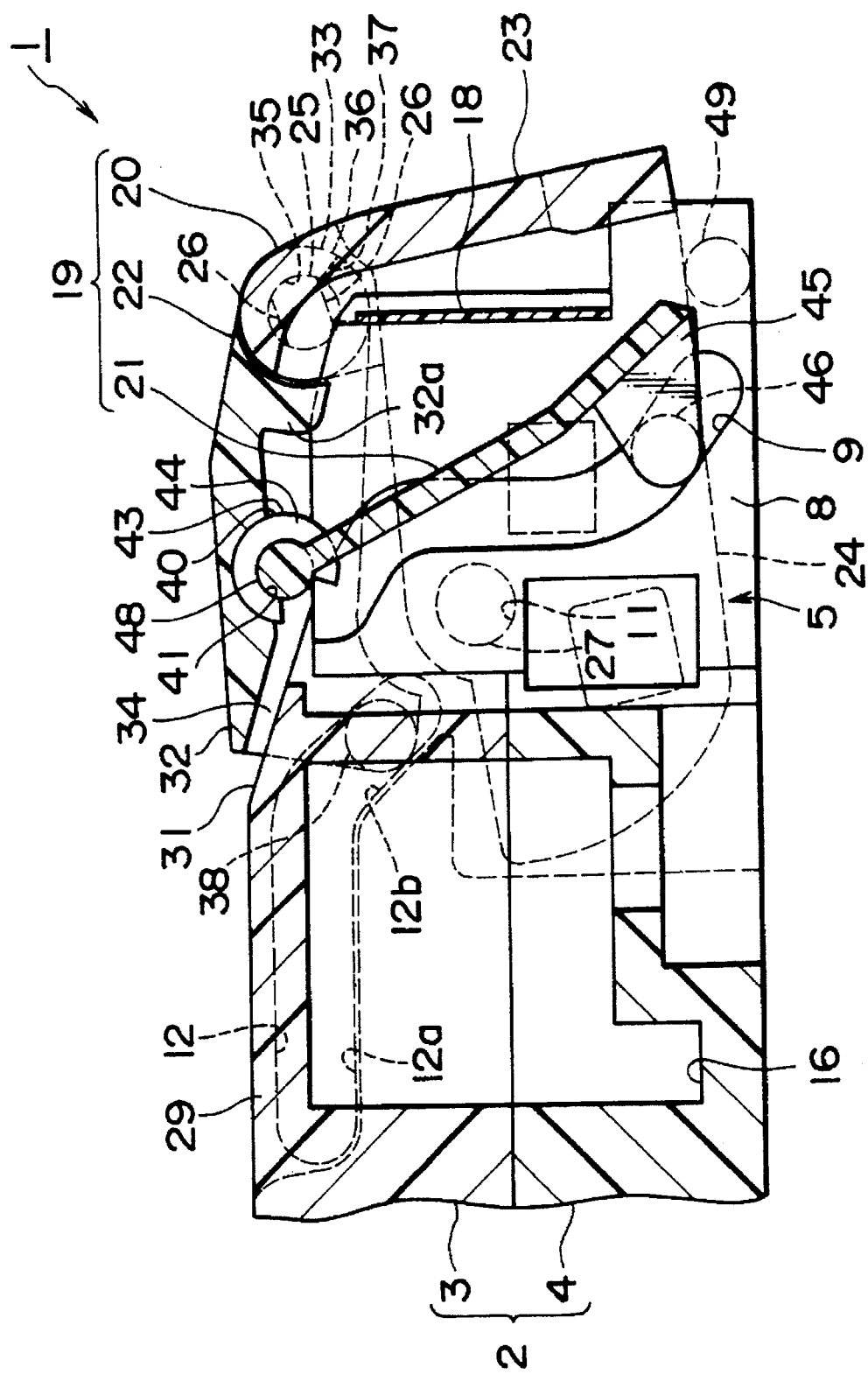
FIG. 9 is an enlarged cross section along line V—V of FIG. 5 when the lid is opening, this figure being continued from FIG. 5.
Figure 10:
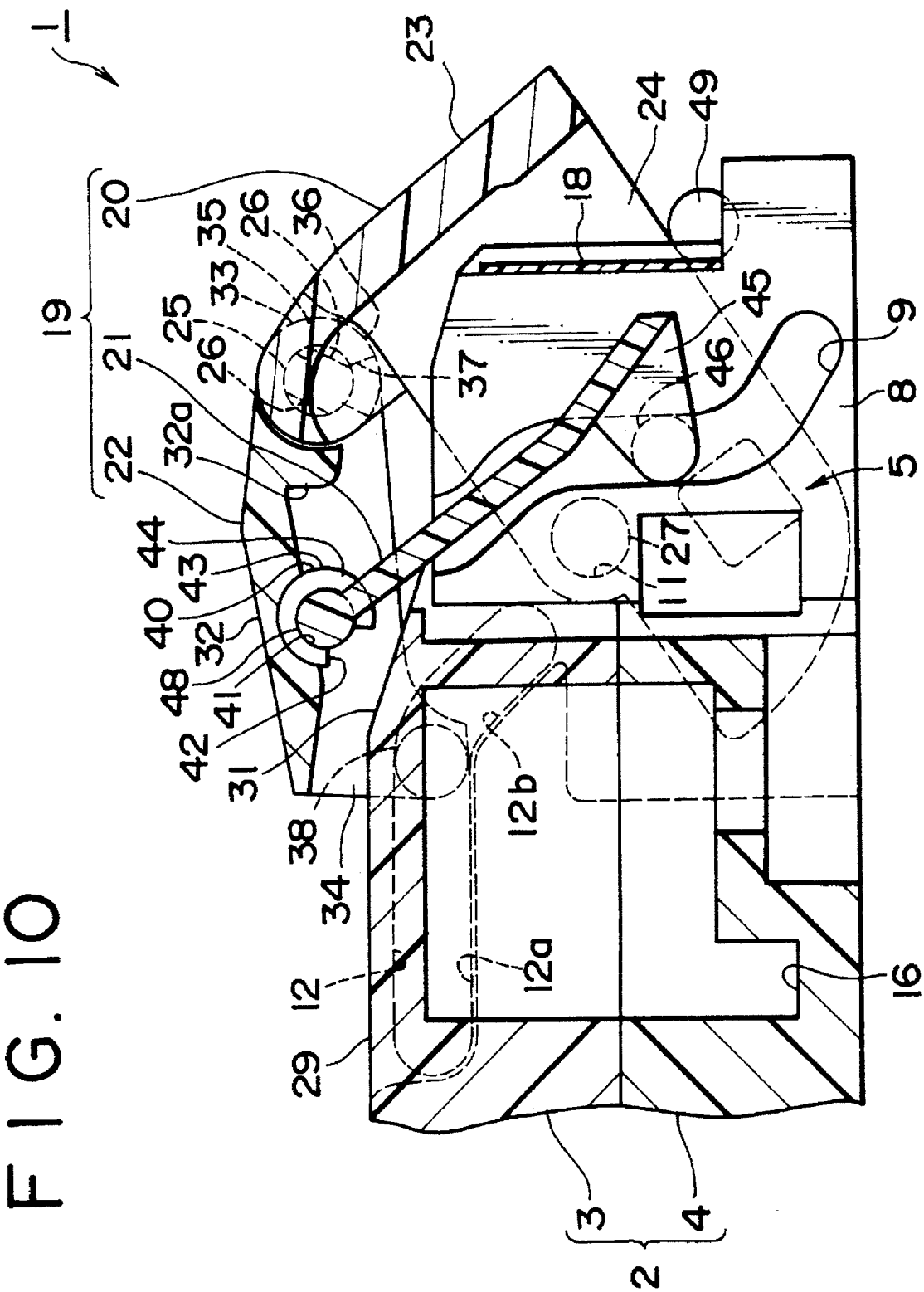
FIG. 10 is an enlarged cross section illustrating a state continued from FIG. 9.

In addition, as for the top lid 22, as seen from the changes in the attitudes shown in FIGS. 9 through 11, a line connecting the center of the supported hole 35 and the center of the opening 37 does not become parallel with the direction in which the planes 26, 26 of the fulcrum pin 25 of the front lid 20, so that the supported holes 35, 35 and the fulcrum pins 25, 25 do not part from each other.

Figure 21:
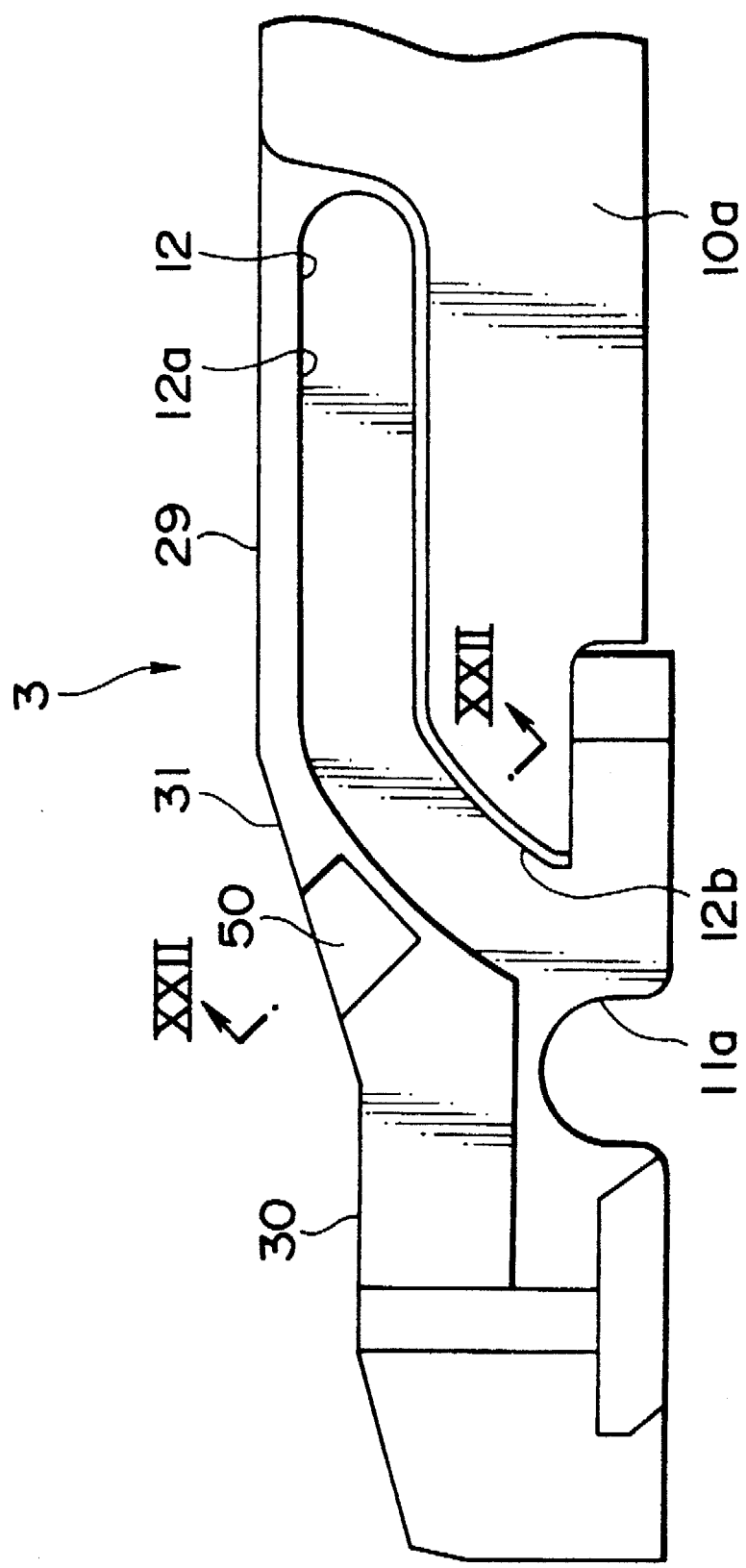
FIG. 21 is an enlarged side view of the front end of the upper half member of a modified example.
Figure 22:
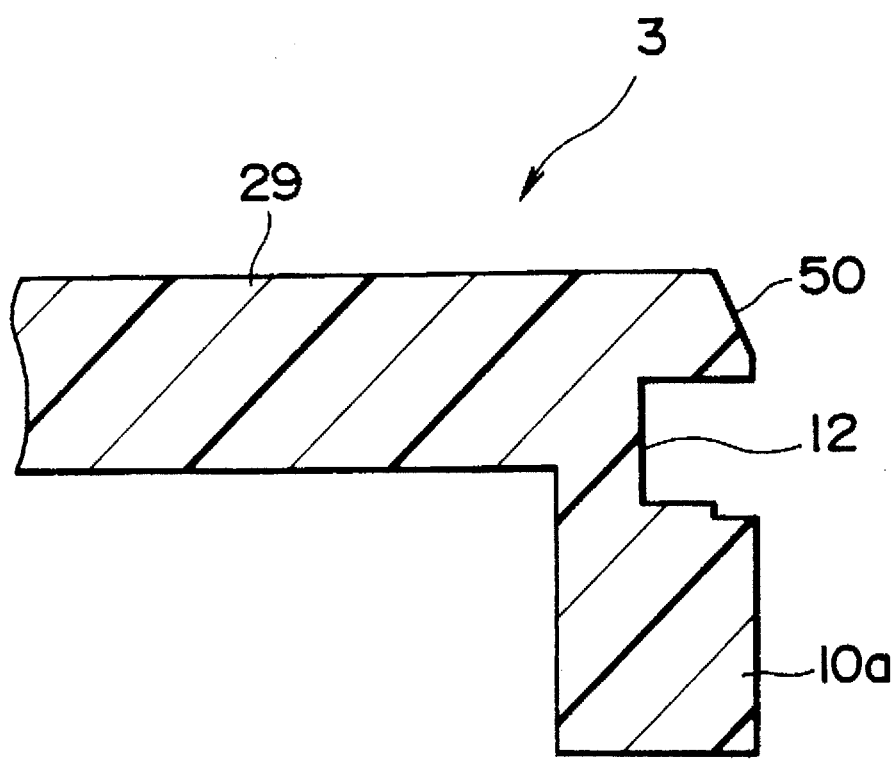
FIG. 22 is a cross section along line XXII—XXII of the front end of the upper half member of FIG. 21.
Figure 23:
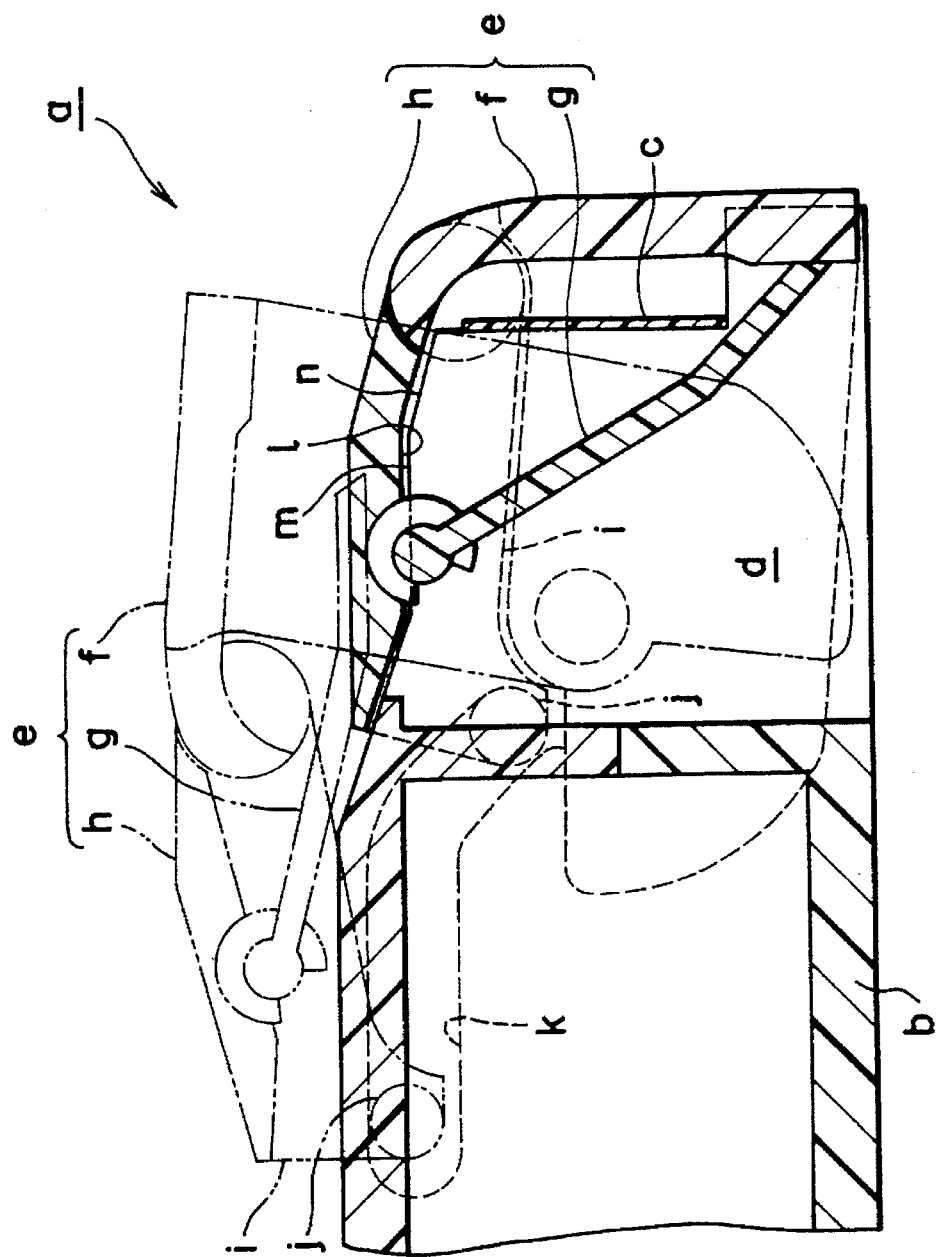
FIG. 23 is an enlarged cross section of a main section of a conventional tape cassette.
Figure 24:
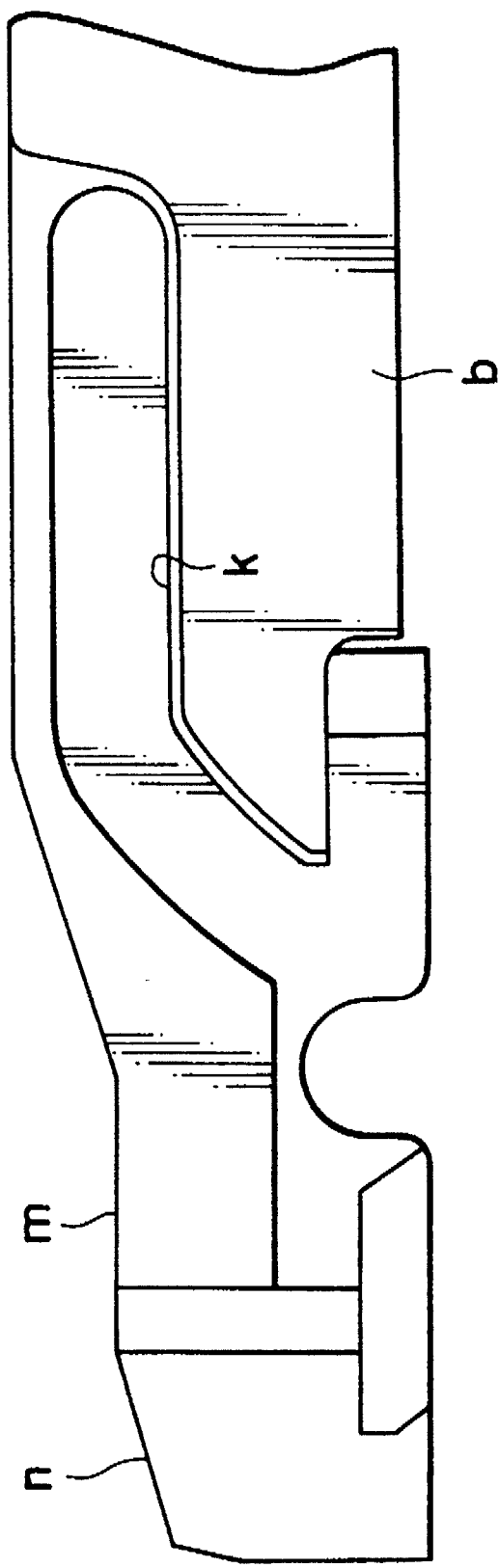
FIG. 24 is an enlarged side view of the front end of the conventional cassette case of FIG. 23.
Figure 25:
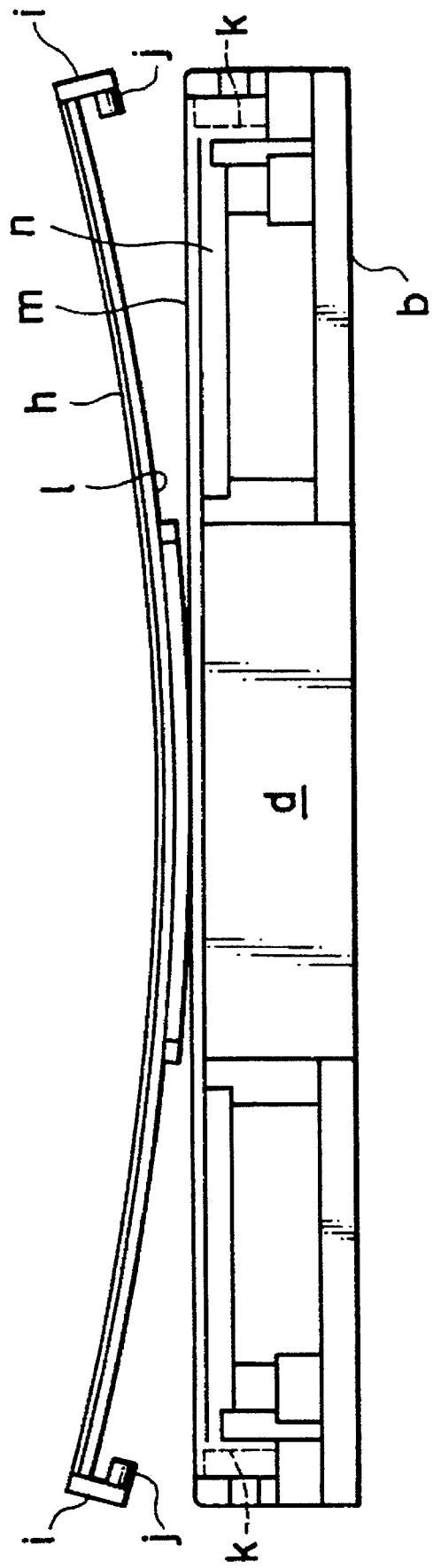
FIG. 25 is schematic front view illustrating a state in which the guided pins of the lid are engaged with the guide grooves of the conventional cassette case of FIG. 23.
Figure 26:
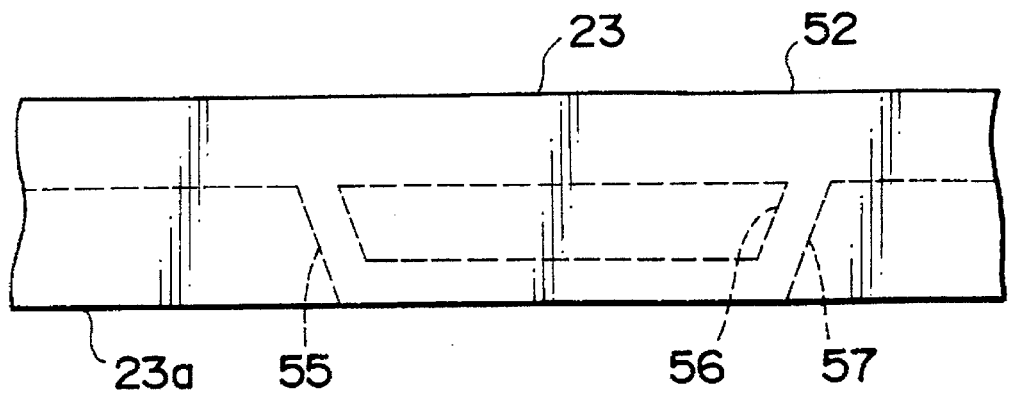
FIG. 26 is an enlarged top view of the main section of the front lid.

FIGS. 21 and 22 show, for example, a variation to the tape cassette practiced as the preferred embodiment of the present invention. This variation is different from the above-mentioned embodiment only in the slope formed on the side face of the cassette case 2. This different slope will be described below.

Reference numerals 50, 50 indicate slopes formed on the outside faces of side walls 10a, 10a of the upper half member 3. The outer ends of the slopes reach the right and left side edges of the tilting portion 31 of the top plate 29 and the inner ends adjoin the tilts 12b, 12b of the guide grooves 12, 12. The slopes 50, 50 are tilted such that the inner ends of the slopes are positioned at the same place as the outside faces of the side walls 10a, 10a and the outer ends approach to each other.

Consequently, to engage the guided pins 38, 38 of the top lid 22 with the guide grooves 12, 12, the tops of the guided pins 38, 38 are abutted against the outer ends of the slopes 50, 50. In this state, the guided pins 38, 38 are pressed into the tilts 12b, 12b of the guide grooves 12, 12. When the guided pins 38, 38 are pressed, the main section 32 of the top lid 22 is bent to expand the interval between the guided pins 38, 38. When the interval is expanded, the guided pins 38, 38 move along the slopes 50, 50 toward their ends to be engaged with the tilts 12b, 12b of the guide grooves 12, 12.

Figure 27:
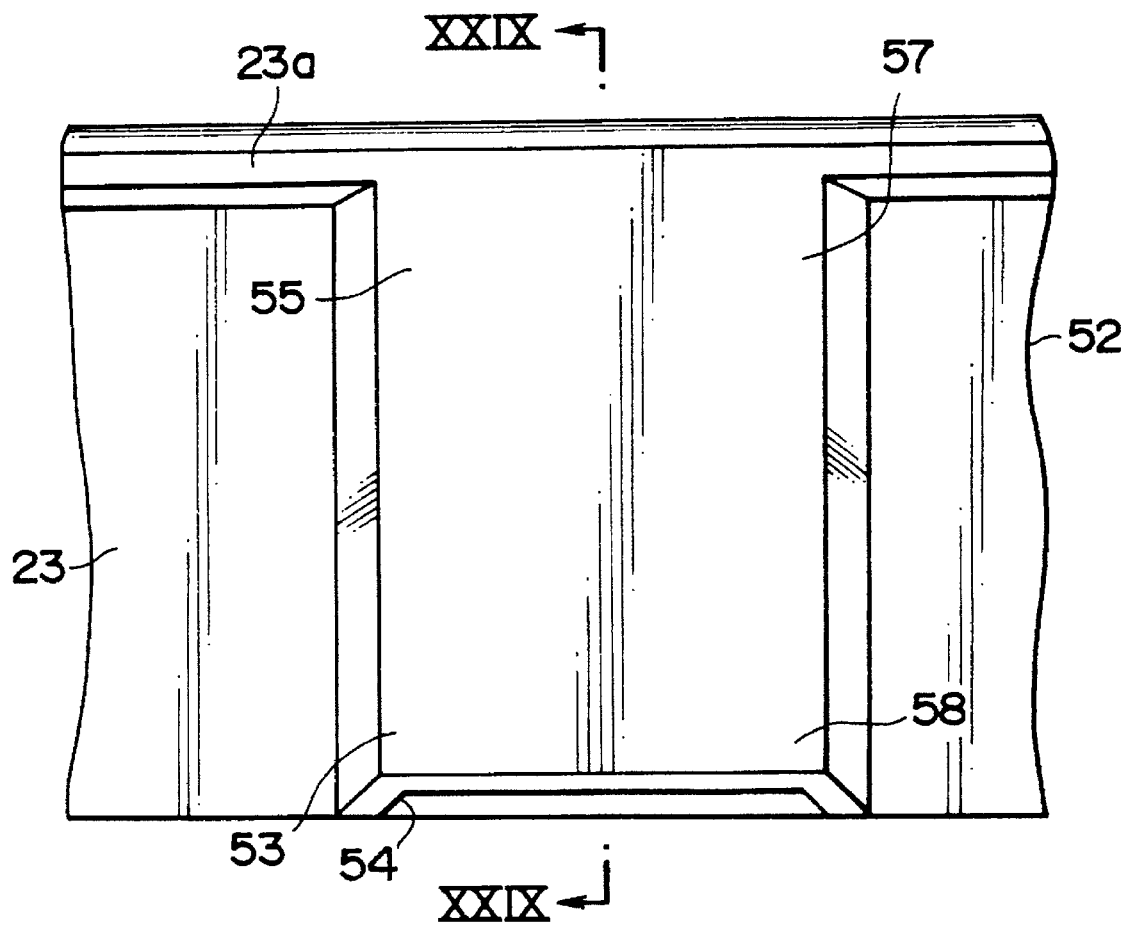
FIG. 27 is an enlarged rear view of the main section of the front lid.
Figure 28:
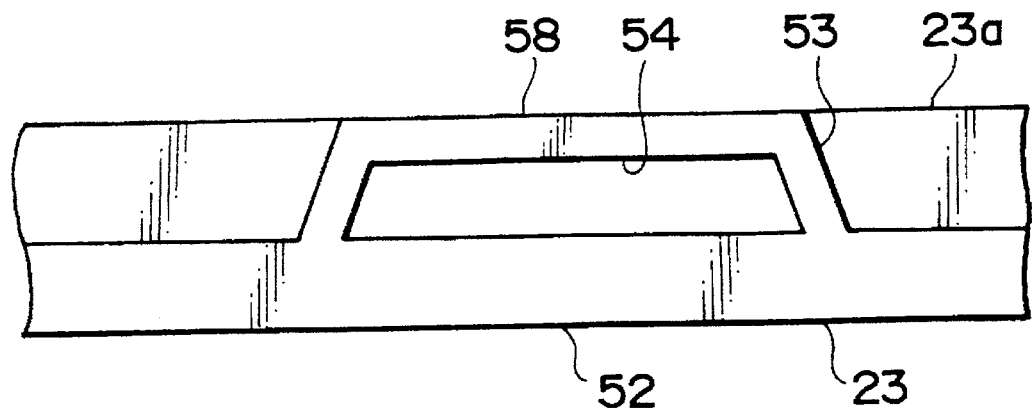
FIG. 28 is an enlarged bottom view of the main section of the front lid.
Figure 29:
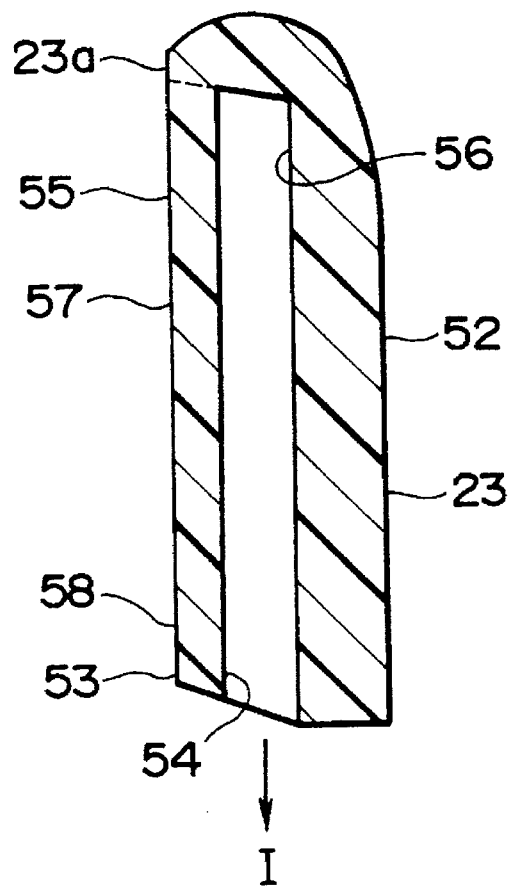
FIG. 29 is a cross section along line XXIII—XXIII of FIG. 27.
Figure 30:
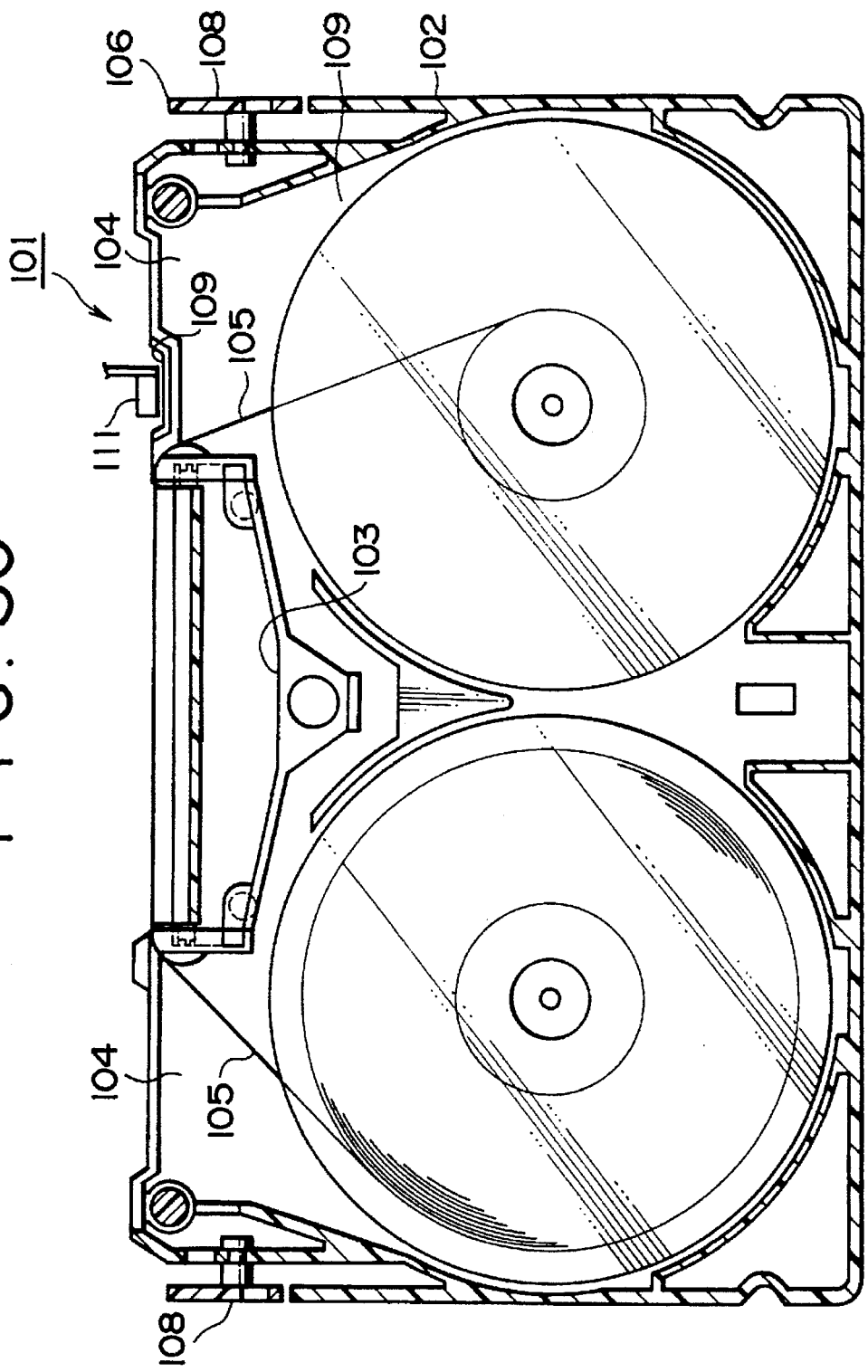
FIG. 30 is a horizontal cross-section of a conventional tape cassette wherein the front portion of the cassette is exposed.
Figure 31:
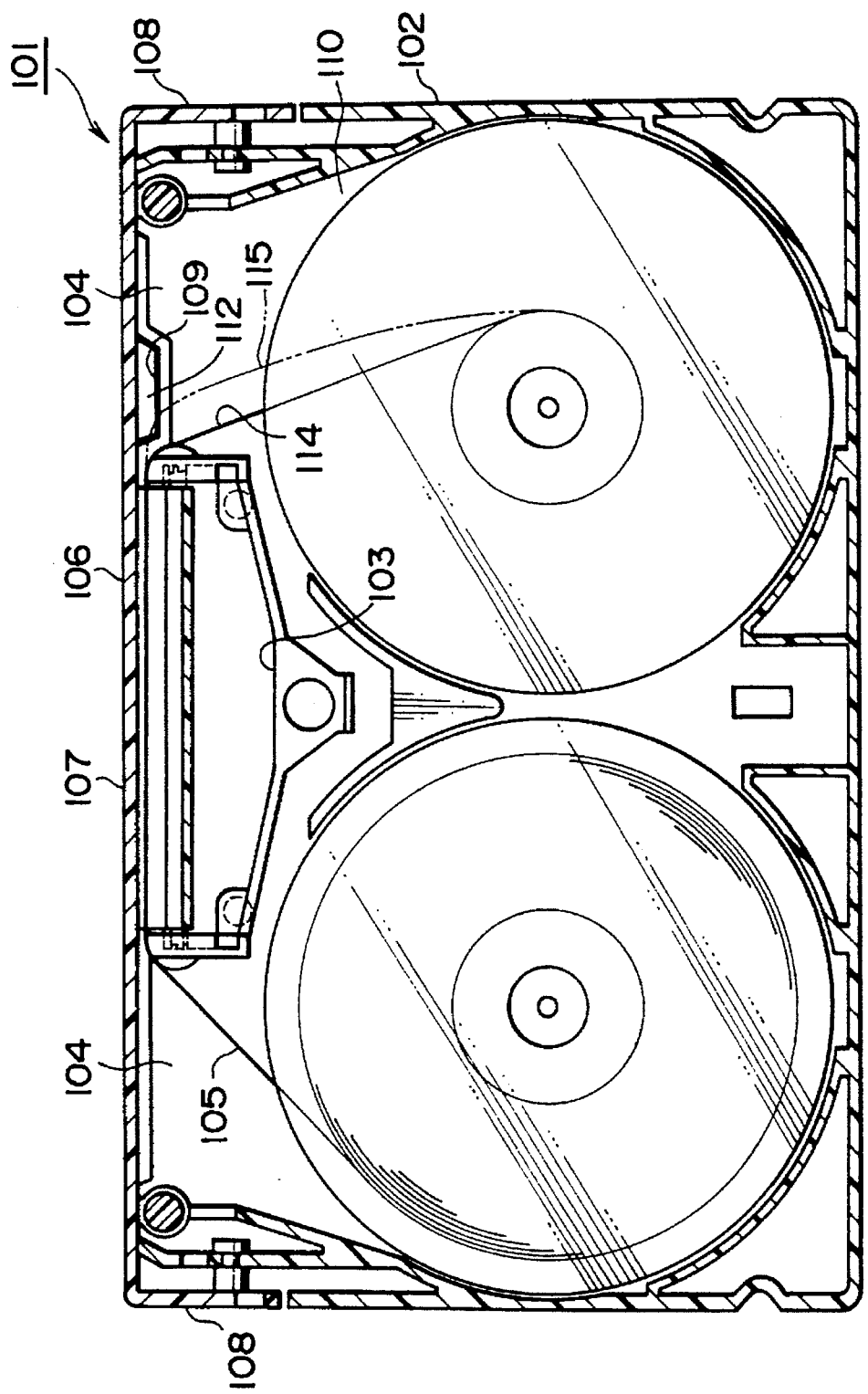
FIG. 31 is a horizontal cross-section of the conventional tape cassette of FIG. 30 with the front portion of the tape cassette covered.

FIGS. 27 through 29 show an example of a variation of the front lid.

Reference numeral 52 indicates a front lid, which is generally the same as the above-mentioned front lid 20 except for the closing projection 55 formed with on the front lid 52 and the contour around the closing projection. Therefore, the same references are given to the same portions of the front lid 20.

The reference numeral 53 indicates the closing projection shaped and sized to complement the portions above the projecting edge 15 of the recess 13. In addition, the closing projection 53 is formed with an insert hole 54 except for the outer peripheral portion.

Reference numeral 55 indicates a projection integrally formed on the front lid 52 at its inner face above the closing projection 53. The top of the projection 55 continues to an overhang 23a. The projection 55 is formed with a deep recess 56 whose lower end reaches near the top end continued from the insert hole 54 of the closing projection 53. An outer face 57 of the projection 55 provides a projecting face that continues to a projecting end face 58 of the closing projection 53 in flush therewith.

It should be noted that, for the convenience of description, the closing projection 53 and the projection 55 are described herein as separate items, which are simply thought of as separate items conceptually. Actually, the closing projection 53 and the projection 55 are formed integrally and therefore the insert hole 54, the recess 56, the projection 57, and the projecting end face 58 are shown separately in a conceptual manner.

Thus, also in the front lid 52, if the magnetic tape 18 is slack when the lid moves from the closed position to the open position, the lower edge of the magnetic tape 18 abuts against the projecting face 57 to be guided relatively downward without being caught by the closing projection 53 because the front lid 52 is formed at its inner face with the projecting face 57 with its lower end continuing to the projecting end face 58 of the closing projection 53 in flush with the projecting end face.

Figure 14:
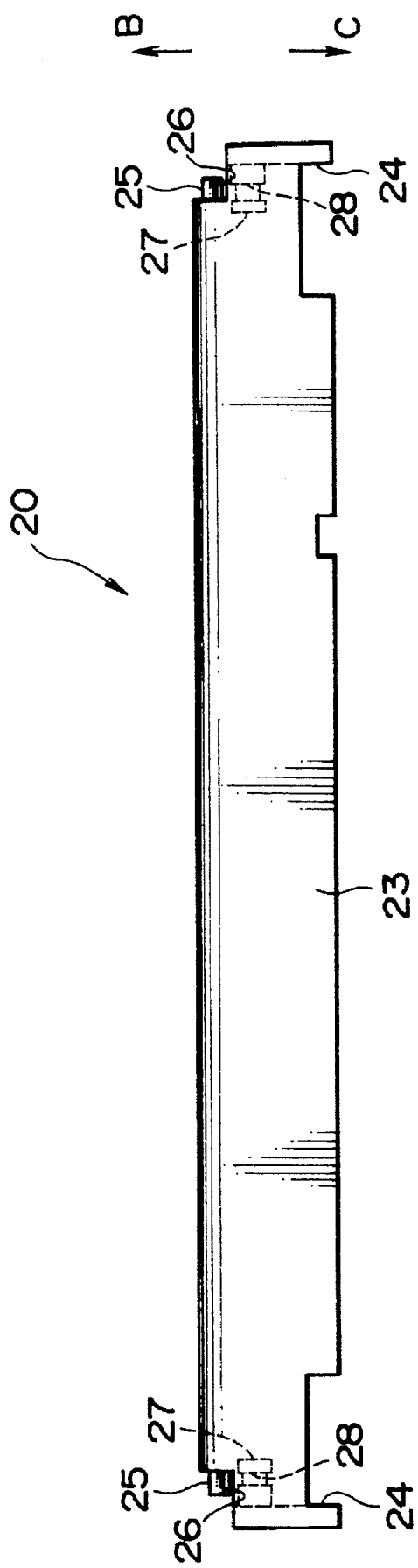
FIG. 14 is a front view illustrating the front lid.
Figure 15:
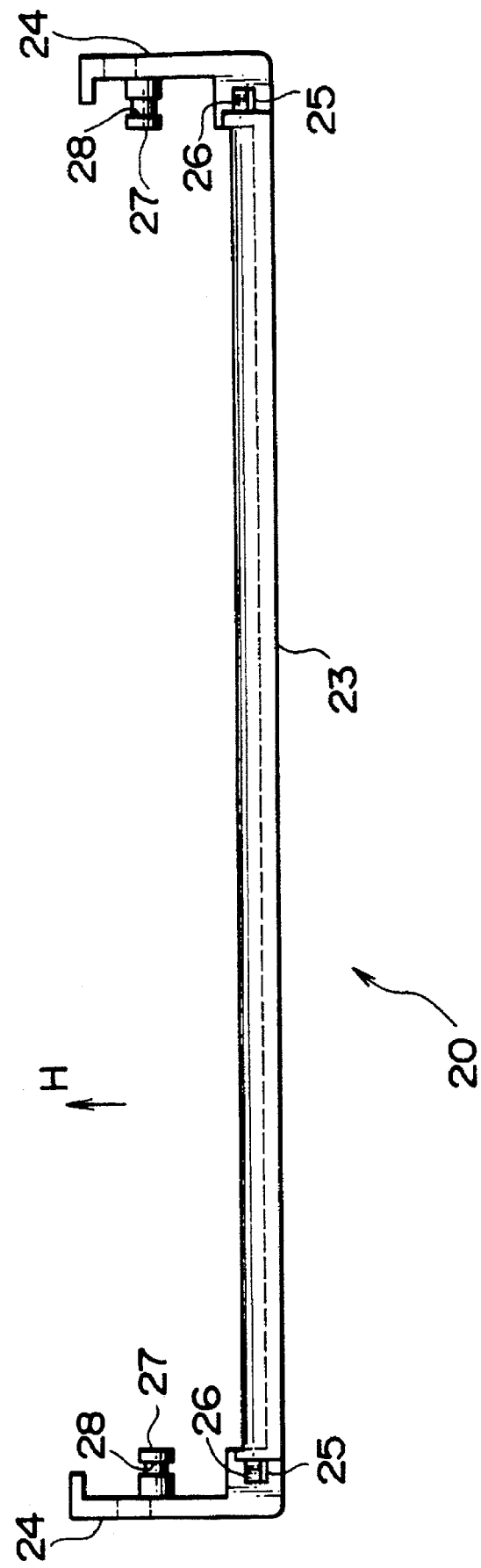
FIG. 15 is a top view illustrating the front lid.
Figure 16:
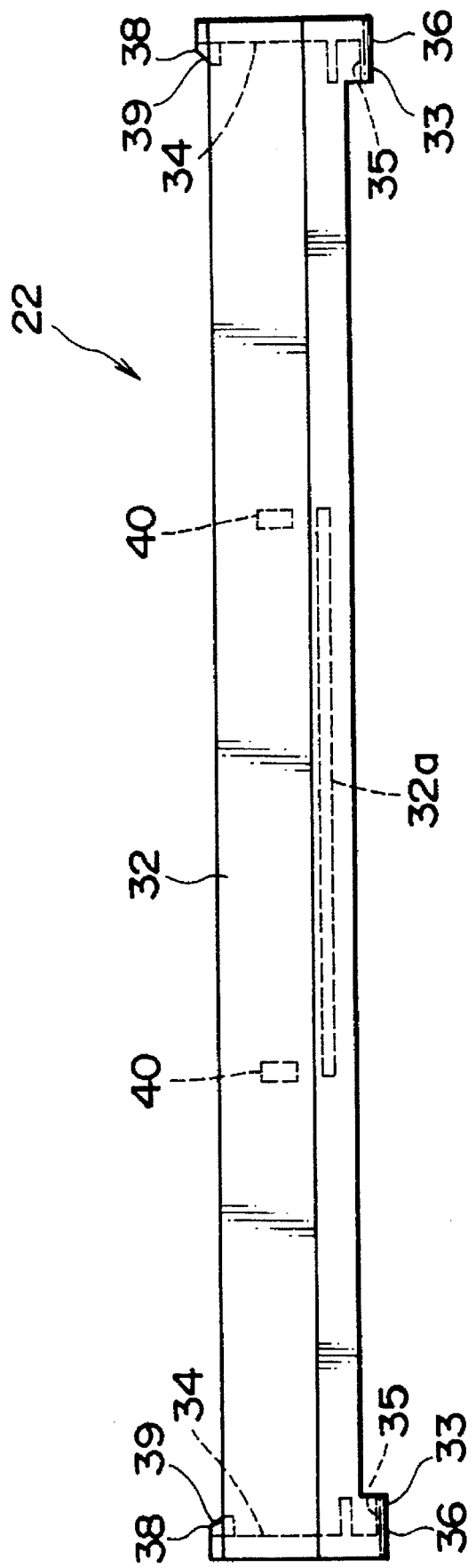
FIG. 16 is a top view of the top lid.
Figure 17:
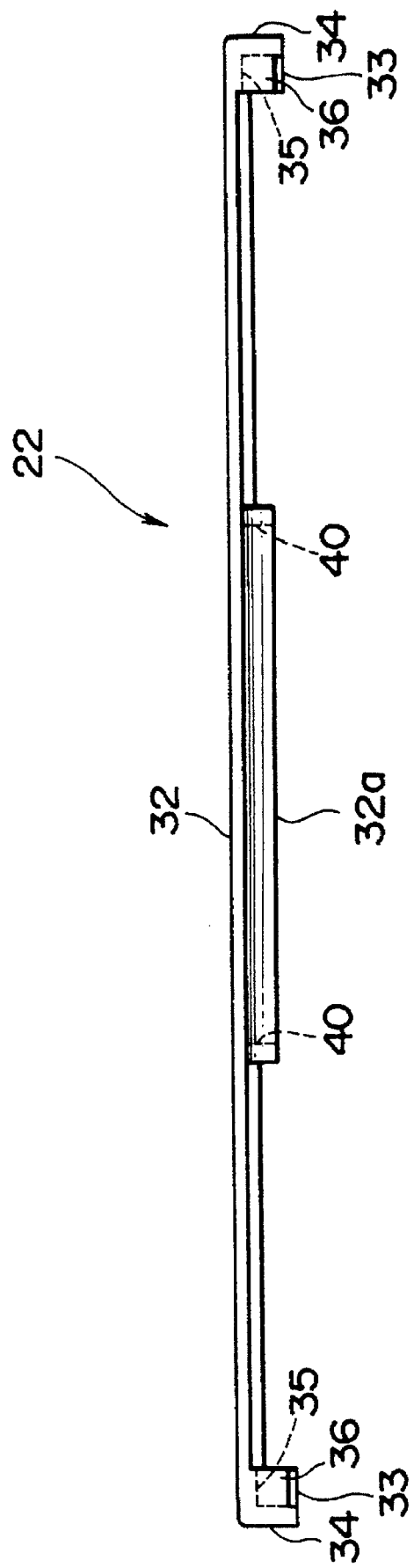
FIG. 17 is a front view of the top lid.
Figure 18:
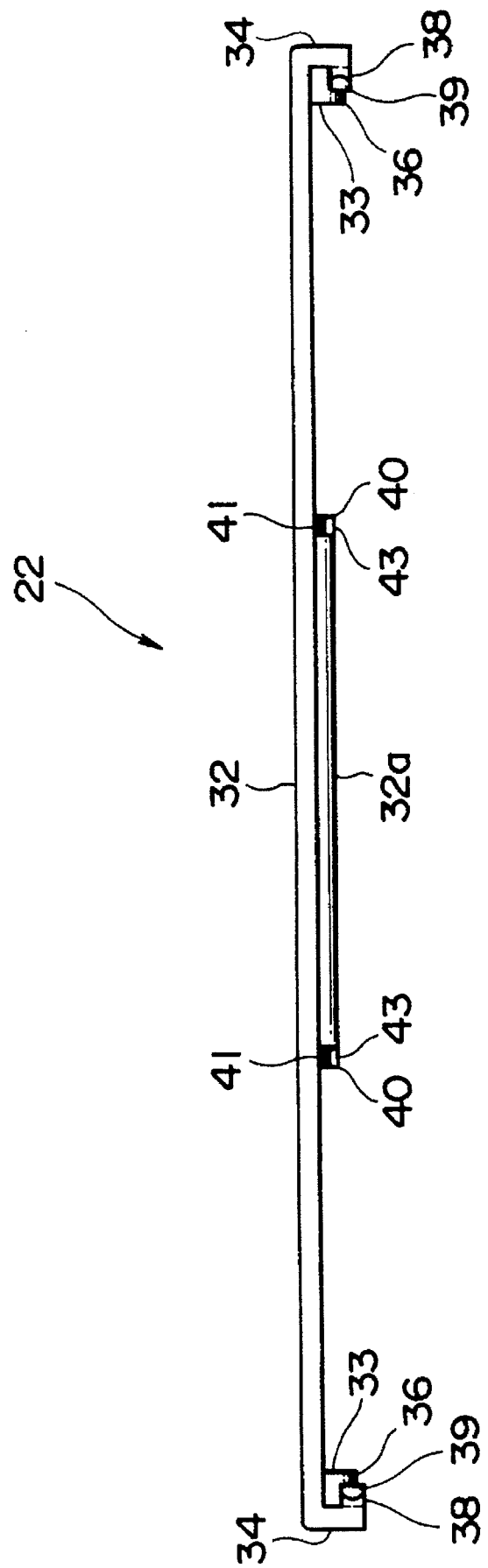
FIG. 18 is a rear view of the top lid.
Figure 19:
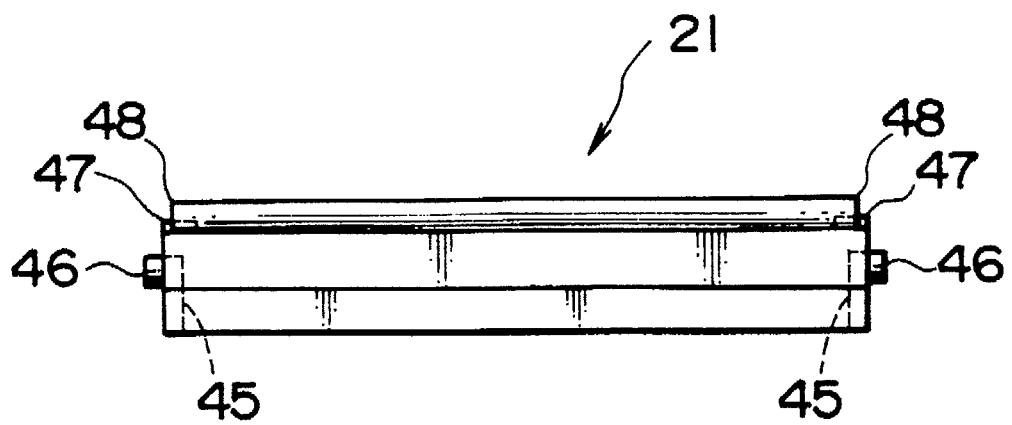
FIG. 19 is a top view of the back lid.
Figure 20:
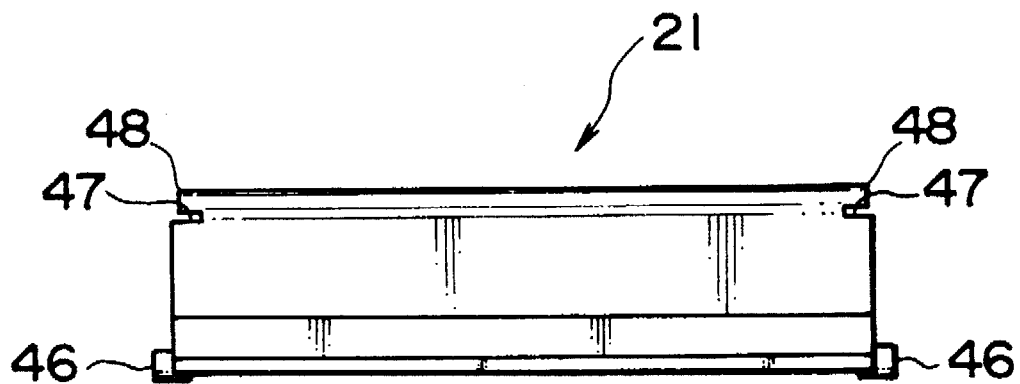
FIG. 20 is a front view of the back lid.

It should be noted that, when molding the front lid 20, the mold splitting directions for whole lid are B and C shown in FIG. 14. However, to mold the ribs 30, 30, a slide mold must be used that draws the mold in the direction of H shown in FIG. 15.

As for the front lid 52 according to this variation, the mold drawing direction for the closing projection 53 and the projection 55 is I shown in FIG. 29, which coincides with the mold splitting direction for the whole front lid 52, so that the slide mold need not be used, thereby preventing the mold structure from being complicated.

While the preferred embodiments of the present invention have been described using specific terms, such description is for illustrative purposes only, and it is to be understood that changes and variations may be made without departing from the spirit or scope of the appended claims.

What is claimed is:

1. A tape cassette for use in a recording/reproducing apparatus, wherein:

a front lid is swingably secured on a cassette case, said front lid covering and protecting, when said tape cassette is not in use, a recording medium tape at a portion exposed out of said cassette case in which said recording medium tape is accommodated;

said cassette case is formed at a front section thereof with a recess through which a lid-opening member passes, said lid-opening member being provided on said recording/reproducing apparatus for opening the front lid of said tape cassette;

said front lid is formed at an inner face thereof with a closing projection to be engaged with said recess, and said front lid is further formed at the inner face thereof with a rib being flush with a projected end face of said closing projection, said rib being positioned generally in parallel with said recording medium tape when said front lid is closed.

2. A tape cassette comprising:

a flat, box-like cassette case;

a recording medium tape accommodated in said cassette case;

a lid for protecting, when said tape cassette is not in use, a portion of said recording medium tape exposed out of said cassette case; wherein a fulcrum of said lid is composed of a fulcrum pin and a receiving portion for receiving and holding said fulcrum pin, said receiving portion being made of an elastic synthetic resin and having a circular inner peripheral face for receiving said fulcrum pin, said inner peripheral face being partially notched for providing an introducing portion, and a frontage of said introducing portion being slightly smaller than an outer diameter of said fulcrum pin;

said fulcrum pin being notched on an outer peripheral face thereof along an axis of said fulcrum pin at opposite sides of said axis to form generally an ellipse in cross section of said fulcrum pin; and said frontage of said introducing portion of said receiving portion for receiving said fulcrum pin is slightly smaller than an interval between the notches formed on said fulcrum pin.

3. A tape cassette as defined in claim 2, wherein:

in a state where said lid is assembled on said cassette case, an imaginary line connecting between the center of said receiving portion and the midpoint of said introducing portion crosses faces of said notches formed on said fulcrum pin.

4. A tape cassette as defined in claim 2, wherein:

said receiving portion is formed with an outer peripheral face spaced from said inner peripheral face at a constant distance;

a member formed with said fulcrum pin is further formed with a step opposite to said fulcrum pin;

an interval between said fulcrum pin and said step is generally equal to or slightly larger than the interval between said inner peripheral face and said outer peripheral face of said receiving portion; and in the state where said lid is assembled on said cassette case, a portion between said inner peripheral face and said outer peripheral face of said receiving portion is positioned between said fulcrum pin and said step.

5. A tape cassette as defined in claim 4, wherein said lid comprises:

a front lid for covering the front side of said recording medium tape;

a back lid for covering the rear side of said recording medium tape; and a top lid for covering the top side of said recording medium tape; wherein said fulcrum is formed between said top lid and said back lid.

6. A tape cassette as defined in claim 5, wherein said fulcrum pin is formed on said back lid and said receiving portion is formed on said top lid.

7. A tape cassette as defined in claim 4, wherein said lid comprises:

a front lid for covering the front side of said recording medium tape;

a back lid for covering the rear side of said recording medium tape; and a top lid for covering the top side of said recording medium tape; wherein said fulcrum is formed between said front lid and said top lid.

8. A tape cassette as defined in claim 7, wherein:

said fulcrum pin is formed on said front lid and said receiving portion is formed on said top lid.

9. A tape cassette having a lid for covering and protecting, when said tape cassette is not in use, a recording medium tape at a portion thereof exposed out of a cassette case in which said recording medium tape is accommodated, the attitude of said lid moving between the closed position of said lid in which said recording medium tape is covered when said tape cassette is not in use and the open position of said lid in which said recording medium tape is exposed when said tape cassette is in use being controlled by slidably engaging a guided pin formed on said lid at each of the opposite sides thereof with a guide groove formed on an outside face of said cassette case, wherein:

slopes are formed on said outside face on which said guide groove is formed, the inner end of each of said slopes being positioned in the vicinity of said guide groove, the outer end of each of said slopes reaching at least one of the sides of said cassette case, and an interval between said slopes larger at the inner ends than at the outer ends thereof.

10. A tape cassette as defined in claim 9, wherein:

the side that said outer ends of said slopes reach is the front face of said cassette case.

11. A tape cassette as defined in claim 10, wherein:

the side that said inner ends of said slopes reach is the top face of said cassette case.

12. A tape cassette as defined in claim 11, wherein:

each of guided pins is formed with a tilt, the interval between the tilts is large at one end thereof and small at the other end thereof.

13. A tape cassette for use in a recording/reproducing apparatus, wherein:

a front lid is swingably secured on a cassette case, said front lid covering and protecting, when said tape cassette is not in use, a recording medium tape at a portion exposed out of said cassette case in which said recording medium tape is accommodated;

said cassette case is formed at a front section thereof with a passing recess through which a lid-opening member passes, said lid-opening member being provided on said recording/reproducing apparatus for opening a front lid of said tape cassette;

said front lid is formed at an inner face thereof with a closing projection to be engaged with said passing recess; and said front lid is further formed at the inner face thereof with a projecting face being flush with a projected end face of said closing projection, said projected end being positioned generally in parallel with said recording medium tape when said front lid is closed.

14. A tape cassette as defined in claim 13, wherein:

said closing projection is formed at an upper side thereof with projection portions for forming said projected face, said projection portions being formed with a bored recess that opens toward the lower end of said projection portions.

15. A tape cassette as defined in claim 14, wherein:

said passing recess is formed at the lower portion thereof with a step, said step being engaged with the lower face of said closing projection when said front lid is closed.

* * * * *